United States Patent
Yanagisawa

(10) Patent No.: US 12,538,032 B2
(45) Date of Patent: Jan. 27, 2026

(54) IMAGING SUPPORT DEVICE, IMAGING SUPPORT METHOD, AND PROGRAM

(71) Applicant: FUJIFILM Corporation, Tokyo (JP)

(72) Inventor: Takuto Yanagisawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 54 days.

(21) Appl. No.: 18/736,492

(22) Filed: Jun. 6, 2024

(65) Prior Publication Data
US 2024/0323542 A1  Sep. 26, 2024

Related U.S. Application Data

(63) Continuation of application No. PCT/JP2022/041380, filed on Nov. 7, 2022.

(30) Foreign Application Priority Data

Dec. 28, 2021  (JP) .................. 2021-214957

(51) Int. Cl.
*H04N 23/698*  (2023.01)
*G06T 7/60*  (2017.01)

(52) U.S. Cl.
CPC .................. *H04N 23/698* (2023.01)

(58) Field of Classification Search
CPC ........ H04N 23/698; H04N 23/60; G06T 7/60; G06T 7/12; G06T 7/001; G06V 40/16
See application file for complete search history.

(56) References Cited

U.S. PATENT DOCUMENTS

| | | | |
|---|---|---|---|
| 9,794,519 B2 * | 10/2017 | Takahashi | G01C 21/3602 |
| 2010/0245578 A1 * | 9/2010 | Kakinami | G06V 20/586 |
| | | | 348/148 |
| 2011/0157386 A1 | 6/2011 | Ishii | |
| 2014/0010459 A1 * | 1/2014 | Sumi | G06V 40/16 |
| | | | 382/195 |
| 2020/0184249 A1 * | 6/2020 | Kimura | G06T 7/12 |

(Continued)

FOREIGN PATENT DOCUMENTS

| | | |
|---|---|---|
| JP | 2007174301 | 7/2007 |
| JP | 2008104179 | 5/2008 |

(Continued)

OTHER PUBLICATIONS

"International Search Report (Form PCT/ISA/210) of PCT/JP2022/041380," mailed on Jan. 31, 2023, with English translation thereof, pp. 1-5.

(Continued)

*Primary Examiner* — Hung H Lam
(74) *Attorney, Agent, or Firm* — JCIPRNET

(57) ABSTRACT

An imaging support device includes a processor, the processor being configured to: extract, based on first position information related to a position of each of a plurality of captured images and on second position information related to a position of an imaging device, an overlap candidate image, which is a candidate to be overlapped with an imaging target region of the imaging device, from the plurality of captured images; derive an overlap ratio between the imaging target region and the overlap candidate image; and output a first signal to the imaging device in a case where the overlap ratio is equal to or greater than a predetermined overlap ratio.

14 Claims, 14 Drawing Sheets

(56) References Cited

U.S. PATENT DOCUMENTS

| | | | |
|---|---|---|---|
| 2021/0092288 A1 | 3/2021 | Horita | |
| 2022/0084183 A1* | 3/2022 | Sakuyama | ............. G06T 7/001 |
| 2023/0072448 A1 | 3/2023 | Horita | |
| 2024/0331418 A1* | 10/2024 | Murozono | ................ G06T 7/60 |

FOREIGN PATENT DOCUMENTS

| | | |
|---|---|---|
| JP | 2010045587 | 2/2010 |
| JP | 4622797 | 2/2011 |
| JP | 2011139368 | 7/2011 |
| JP | 2014115896 | 6/2014 |
| JP | 6441586 | 12/2018 |
| JP | 2020113843 | 7/2020 |
| WO | 2018180214 | 10/2018 |
| WO | 2020008973 | 1/2020 |

OTHER PUBLICATIONS

"Written Opinion of the International Searching Authority (Form PCT/ISA/237) of PCT/JP2022/041380," mailed on Jan. 31, 2023, with English translation thereof, pp. 1-8.

\* cited by examiner

IMAGING SUPPORT DEVICE, IMAGING SUPPORT METHOD, AND PROGRAM

This application is a continuation application of International Application No. PCT/JP2022/041380, filed Nov. 7, 2022, the disclosure of which is incorporated herein by reference in its entirety. Further, this application claims priority under 35 USC 119 from Japanese Patent Application No. 2021-214957 filed Dec. 28, 2021, the disclosure of which is incorporated by reference herein.

BACKGROUND OF THE INVENTION

1. Field of the Invention

The technology of the present disclosure relates to an imaging support device, an imaging support method, and a program.

2. Description of the Related Art

JP2010-045587A discloses a camera device including an image capturing unit that captures an image; an image display unit comprising a screen on which at least the image is displayed; a shake detection unit that detects a device shake during image capturing with the image capturing unit; an image recording unit that records information on an image captured by the image capturing unit; a relative relationship calculation unit that obtains a relative relationship degree parameter representing at least a relative positional relationship between an imaging range of a first image captured immediately before and recorded in the image recording unit and an imaging range of a second image captured by the image capturing unit subsequent to the first image; a display control unit that generates an image for indicating the relative positional relationship between the imaging ranges from the relative relationship degree parameter obtained by the relative relationship calculation unit and that displays the image on the screen of the image display unit together with the second image; an overlap calculation unit that obtains an overlap degree parameter representing a degree of overlap between the imaging range of the first image and the imaging range of the second image; a notification unit that performs a predetermined notification to an imager in accordance with the overlap degree parameter obtained by the overlap calculation unit; and an imaging control unit that causes the image capturing unit to capture an image in a case where the overlap degree parameter obtained by the overlap calculation unit is within a predetermined threshold value range and it can be determined from detection output of the shake detection unit that there is substantially no device shake during the image capturing in the image capturing unit.

JP2020-113843A discloses an image capturing support device that supports capturing of a multi-view picture used to restore a three-dimensional shape model of a target object, the image capturing support device comprising a feature point extraction unit that extracts feature points in captured image data, which is image data of the target object imaged immediately before, and in preview image data; a matching processing unit that detects a first corresponding point of the feature point in each of the captured image data and the preview image data; and a support information notification unit that displays a preview image of the preview image data on which the first corresponding point is superimposed, and notifies of support information corresponding to capturing of the preview image.

JP2011-139368A discloses a control device that controls an imaging device such that the imaging device performs a plurality of times of imaging on a subject larger than an angle of view of an imaging lens provided in the imaging device while changing an imaging direction of the imaging device to obtain a plurality of captured images showing the entire subject in total, the control device including a reference image setting unit that sets, as a reference image, a captured image captured in a reference imaging direction of the imaging device among the plurality of captured images; a target size setting unit that sets a target size of an overlapping region between adjacent captured images; an imaging range acquisition unit that acquires an imaging range on the subject obtained in a case where the subject is imaged in the imaging direction set in the imaging device, for a captured image of interest including the reference image; a post-deformation imaging range acquisition unit that acquires, as a post-deformation imaging range of the captured image of interest, a shape of the deformed imaging range obtained in a case where lens aberration correction and perspective correction based on a position and the imaging direction of the imaging device with respect to the subject are performed on an image within the imaging range of the captured image of interest including the reference image; an overlap size calculation unit that calculates a size of the overlapping region in which a post-deformation imaging range of a captured image of interest other than the reference image overlaps with a post-deformation imaging range of a captured image of which an imaging direction has been already determined; and an imaging direction setting unit that searches for an imaging direction in which the size of the overlapping region obtained via the imaging range acquisition unit, the post-deformation imaging range acquisition unit, and the overlap size calculation unit satisfies the target size while updating an imaging direction of the captured image of interest other than the reference image in a range in which the post-deformation imaging range of the captured image of interest overlaps with the post-deformation imaging range of the captured image of which the imaging direction has been already determined, which is adjacent to the post-deformation imaging range of the captured image of interest, and sets the imaging direction as an optimal imaging direction of the captured image of interest, in which each of the plurality of captured images is captured by the imaging device in each of optimal imaging directions set by the imaging direction setting unit.

JP2008-104179A discloses an image file sorting device that sorts out an image file that can be used to generate a panoramic image from among a plurality of image files including image data and image attribute information, which is attribute information of the image data, in which the image attribute information includes position information indicating a geographical position at a time of imaging, the image file sorting device includes an image attribute information readout unit that reads out the position information from each image file, and an image file sorting unit that sorts out a plurality of image files, in which geographical positions at the time of imaging are within a predetermined distance from each other, as the image files that can be used to generate a panoramic image according to the read-out position information.

JP2014-115896A discloses an image processing device comprising an imaging information analysis unit that extracts a matching portion between a plurality of images from imaging information added to the images, and generates update information indicating a non-matching portion and non-update information indicating the matching portion;

and a layout unit that switches a layout method based on the update information and the non-update information.

JP2007-174301A discloses an image capturing device provided with a memory that stores a first captured image; a movement detection unit that detects a movement of the image capturing device and calculates a movement direction and a movement distance; a guide image creation unit that displays the first captured image on a display screen, shifts the displayed first captured image with respect to the display screen in a direction opposite to the movement direction according to the movement distance to fix the display, and displays a fixed image that remains on the display screen after the shift as a guide image; a superimposed image creation unit that displays a current image that is currently being captured by the image capturing device and the guide image on the display screen in a superimposed manner; and a current image acquisition unit stores the current image in the memory as a second captured image in a case where pressing of an imaging button has been detected.

JP4622797B discloses an image combining apparatus comprising a detection unit that detects a duplicate portion of a plurality of pieces of image data; a subject detection unit that detects subjects included in the detected duplicate portion and different from each other; a reception unit that receives an instruction to select any or both of the detected subjects; and a combining unit that combines the plurality of pieces of image data such that the selected subject is included.

JP6441586B discloses an information processing device comprising a first calculation processing module that can execute input processing of receiving data input of an image frame at a constant rate, detection processing of detecting a plurality of feature points by processing in parallel calculation for evaluating whether or not the image frame is a feature point with respect to the input image frame, and description processing of generating a plurality of descriptors describing features of the plurality of feature points, respectively, via parallel processing, at a constant speed through control on a clock-by-clock basis; and a second calculation processing module that can execute processing of obtaining a correspondence relationship between image frames with respect to the plurality of feature points of each image frame detected and described by the first calculation processing module, and position estimation processing of performing position estimation based on the correspondence relationship.

SUMMARY OF THE INVENTION

One embodiment according to the technology of the present disclosure provides an imaging support device, an imaging support method, and a program with which an imaging target region having an overlap ratio with respect to a captured image equal to or greater than a predetermined overlap ratio can be determined with a high degree of freedom, as compared with, for example, a case where an imaging target region having an overlap ratio with respect to a captured image equal to or greater than a predetermined overlap ratio is determined in an order in which a plurality of captured images are obtained.

A first aspect according to the technology of the present disclosure is an imaging support device comprising a processor, in which the processor is configured to: extract, based on first position information related to a position of each of a plurality of captured images and on second position information related to a position of an imaging device, an overlap candidate image, which is a candidate to be overlapped with an imaging target region of the imaging device, from the plurality of captured images; derive an overlap ratio between the imaging target region and the overlap candidate image; and output a first signal to the imaging device in a case where the overlap ratio is equal to or greater than a predetermined overlap ratio.

A second aspect according to the technology of the present disclosure is the imaging support device according to the first aspect, in which the first position information includes an image map indicating the position of each of the plurality of captured images.

A third aspect according to the technology of the present disclosure is the imaging support device according to the first aspect or second aspect, in which the first signal includes an imaging instruction signal for instructing the imaging device to image the imaging target region.

A fourth aspect according to the technology of the present disclosure is the imaging support device according to the third aspect, in which the processor is configured to generate association information that is information for associating a first captured image, which is the overlap candidate image having the overlap ratio equal to or greater than the predetermined overlap ratio, with a second captured image obtained by being captured by the imaging device in response to the imaging instruction signal.

A fifth aspect according to the technology of the present disclosure is the imaging support device according to the fourth aspect, in which the association information includes feature point information related to a feature point included in common in the first captured image and the second captured image.

A sixth aspect according to the technology of the present disclosure is the imaging support device according to the fourth aspect or the fifth aspect, in which the processor is configured to generate a composite image by combining the first captured image and the second captured image based on the association information.

A seventh aspect according to the technology of the present disclosure is the imaging support device according to the sixth aspect, in which the processor includes a combining processor that generates the composite image.

An eighth aspect according to the technology of the present disclosure is the imaging support device according to any one of the fourth to seventh aspects, in which the plurality of captured images include the second captured image, and the processor is configured to update the first position information based on third position information related to a position of the second captured image.

A ninth aspect according to the technology of the present disclosure is the imaging support device according to any one of the first to eighth aspects, in which the second position information is information related to a position of the imaging target region.

A tenth aspect according to the technology of the present disclosure is the imaging support device according to the ninth aspect, in which the second position information is information generated based on fourth position information related to the position of the imaging device, distance information related to a distance between the imaging target region and the imaging device, and posture information related to a posture of the imaging device with respect to the imaging target region.

An eleventh aspect according to the technology of the present disclosure is the imaging support device according to any one of the first to tenth aspects, in which the processor is configured to output a change instruction signal indicating an instruction to change the position and/or a posture of the imaging device in a case where the overlap ratio is less than the predetermined overlap ratio.

A twelfth aspect according to the technology of the present disclosure is the imaging support device according to the eleventh aspect, in which the processor is configured to generate the change instruction signal based on the first position information and the second position information.

A thirteenth aspect according to the technology of the present disclosure is an imaging support method comprising: extracting, based on first position information related to a position of each of a plurality of captured images and on second position information related to a position of an imaging device, an overlap candidate image, which is a candidate to be overlapped with an imaging target region of the imaging device, from the plurality of captured images; deriving an overlap ratio between the imaging target region and the overlap candidate image; and outputting a first signal to the imaging device in a case where the overlap ratio is equal to or greater than a predetermined overlap ratio.

A fourteenth aspect according to the technology of the present disclosure is a program causing a computer to execute a process comprising: extracting, based on first position information related to a position of each of a plurality of captured images and on second position information related to a position of an imaging device, an overlap candidate image, which is a candidate to be overlapped with an imaging target region of the imaging device, from the plurality of captured images; deriving an overlap ratio between the imaging target region and the overlap candidate image; and outputting a first signal to the imaging device in a case where the overlap ratio is equal to or greater than a predetermined overlap ratio.

DESCRIPTION OF THE PREFERRED EMBODIMENTS

Hereinafter, an example of an embodiment of an imaging support device, an imaging support method, and a program according to the technology of the present disclosure will be described with reference to the accompanying drawings.

First, the terms used in the following description will be described.

IMU is an abbreviation for "inertial measurement unit". LiDAR is an abbreviation for "light detection and ranging". I/F is an abbreviation for "interface". CPU is an abbreviation for "central processing unit". GPU is an abbreviation for "graphics processing unit". TPU is an abbreviation for "tensor processing unit". ROM is an abbreviation for "read-only memory". RAM is an abbreviation for "random-access memory". NVM is an abbreviation for "non-volatile memory". HDD is an abbreviation for "hard disk drive". SSD is an abbreviation for "solid-state drive". USB is an abbreviation for "Universal Serial Bus". DRAM is an abbreviation for "dynamic random-access memory". SRAM is an abbreviation for "static random-access memory". CMOS is an abbreviation for "complementary metal-oxide-semiconductor". ASIC is an abbreviation for "application-specific integrated circuit". FPGA is an abbreviation for "field-programmable gate array". PLD is an abbreviation for "programmable logic device". SoC is an abbreviation for "system-on-chip". IC is an abbreviation for "integrated circuit".

In the description of the present specification, the term "perpendicular" indicates perpendicularity in the sense of including an error generally allowed in the technical field, to which the technology of the present disclosure belongs, and an error that does not go against the gist of the technology of the present disclosure, in addition to perfect perpendicularity.

Figure 1:
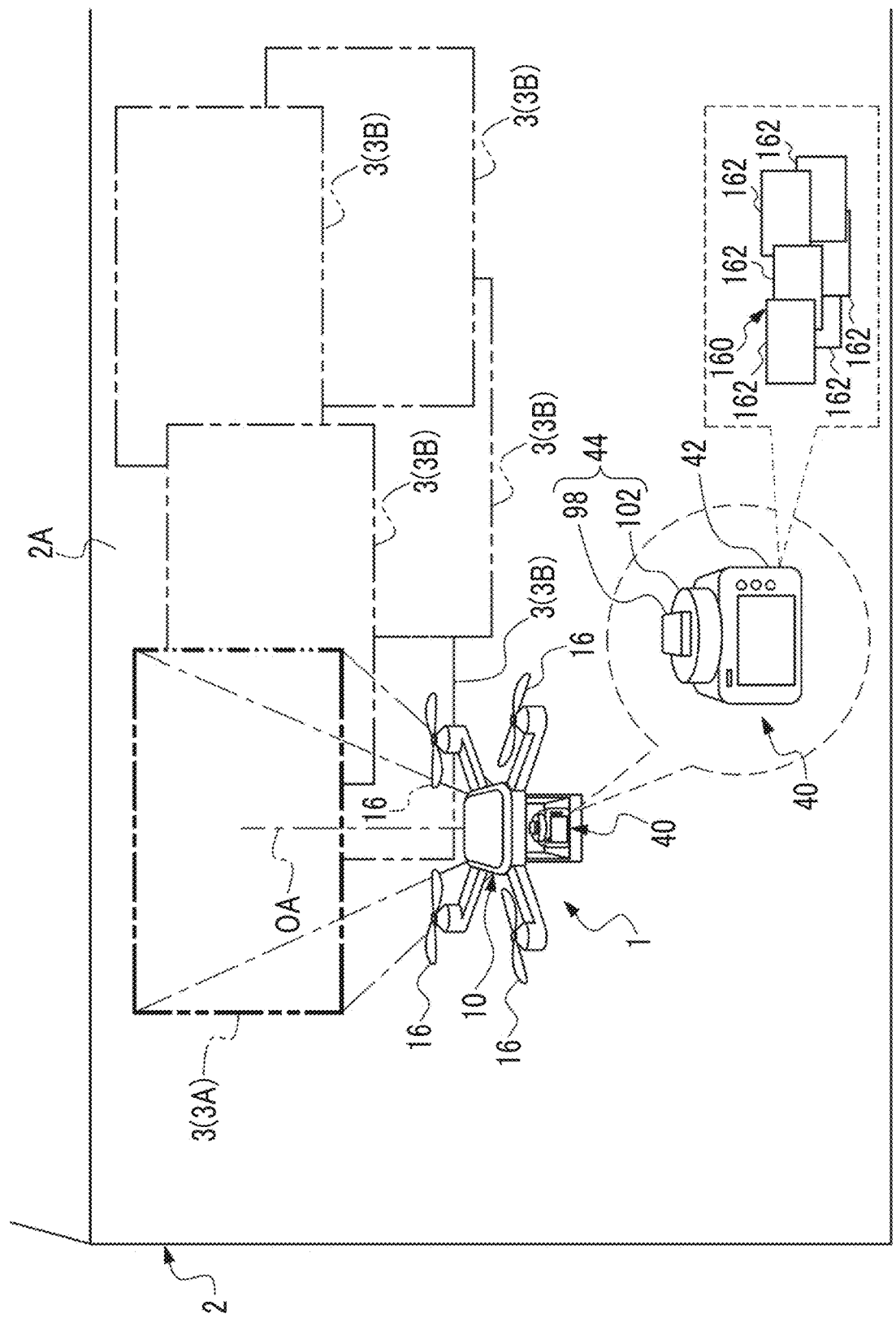
FIG. 1 is a perspective view showing an example of a flight imaging apparatus.

As shown in FIG. 1 as an example, a flight imaging apparatus 1 comprises a flight function and an imaging function, and images a wall surface 2A of an object 2 while flying. In the description of the present specification, the concept of "flight" includes not only the meaning that the flight imaging apparatus 1 moves in the air but also the meaning that the flight imaging apparatus 1 is stationary in the air.

The wall surface 2A is, for example, a plane. The plane refers to a two-dimensional surface (that is, a surface along a two-dimensional direction). In addition, in the description of the present specification, the concept of "plane" does not include the meaning of a mirror surface. In the present embodiment, for example, the wall surface 2A is a plane defined in a horizontal direction and a vertical direction (that is, a surface extending in the horizontal direction and the vertical direction). The wall surface 2A includes irregularities. The irregularities referred to here include, for example, irregularities associated with a defect and/or a deficiency in addition to irregularities due to a material forming the wall surface 2A. As an example, the object 2 having the wall surface 2A is a bridge pier provided in a bridge. The bridge pier is made of, for example, reinforced concrete. Here, the example of the object 2 is the bridge pier, but the object 2 may be an object other than the bridge pier.

The flight function of the flight imaging apparatus 1 (hereinafter, also simply referred to as the "flight function") is a function of the flight imaging apparatus 1 flying based on a flight instruction signal. The flight instruction signal refers to a signal for instructing the flight imaging apparatus 1 to fly. The flight instruction signal is transmitted from, for example, a transmitter (not shown) for controlling the flight imaging apparatus 1 and/or a base station (not shown) that sets a flight route for the flight imaging apparatus 1. The imaging function of the flight imaging apparatus 1 (hereinafter, also simply referred to as the "imaging function") is a function of the flight imaging apparatus 1 imaging a subject (for example, the wall surface 2A of the object 2).

The flight imaging apparatus 1 comprises a flying object 10 and an imaging device 40. The flying object 10 is, for example, an unmanned aerial vehicle such as a drone. The flight function is realized by the flying object 10. The flying object 10 includes a plurality of propellers 16, and flies by rotating the plurality of propellers 16.

The imaging device 40 comprises an imaging device body 42 and a sensor unit 44. The imaging device 40 is an example of an "imaging apparatus" according to the technology of the present disclosure. The imaging device body 42 is, for example, a digital camera or a video camera. The imaging function is realized by the imaging device body 42. The sensor unit 44 is provided on an upper part of the imaging device body 42 as an example. The sensor unit 44 comprises an inertial sensor 98 and a distance sensor 102.

The inertial sensor 98 is, for example, an IMU and comprises an acceleration sensor and a gyro sensor. The acceleration sensor detects an acceleration in each axis direction of a pitch axis, a yaw axis, and a roll axis of the imaging device 40. The gyro sensor detects an angular velocity around each axis of the pitch axis, the yaw axis, and the roll axis of the imaging device 40. The distance sensor 102 is, for example, a LiDAR scanner, and measures a distance between the wall surface 2A and the distance sensor 102. It should be noted that a stereo camera may be used as the imaging device 40 instead of the distance sensor 102. In addition, the imaging device 40 may be a phase difference pixel camera having a function of measuring a distance between the wall surface 2A and the imaging device 40.

The flight imaging apparatus 1 sequentially images a plurality of regions 3 of the wall surface 2A. The region 3 is a region determined by an angle of view of the flight imaging apparatus 1. In the example shown in FIG. 1, a quadrangular region is shown as an example of the region 3. The flight imaging apparatus 1 generates a composite image 160 by combining a plurality of images 162 obtained by sequentially imaging the plurality of regions 3.

The plurality of images 162 used for the generation of the composite image 160 also include images on which a projective transformation is performed. The image on which the projective transformation is performed refers to, for example, an image obtained by correcting an image including an image region distorted into a trapezoidal shape or the like because of a posture (for example, a depression angle or an elevation angle) of the imaging device 40. The projective transformation is processing performed on an image obtained by imaging the wall surface 2A with the imaging device 40 in a state where the posture of the imaging device 40 is inclined with respect to the wall surface 2A (that is, in a state where an optical axis OA of the imaging device body 42 is inclined with respect to the wall surface 2A).

The distortion of the image caused by the depression angle or the elevation angle is corrected by performing the projective transformation. That is, the image obtained by performing the imaging with the imaging device 40 in a state where the posture of the imaging device 40 is inclined with respect to the wall surface 2A is transformed like an image obtained by performing the imaging from a position facing the wall surface 2A, by performing the projective transformation. The projective transformation is performed using a distance between the wall surface 2A included in the region 3 and the imaging device body 42, a focal length, and a posture of the imaging device body 42 with respect to the wall surface 2A. A distance between the wall surface 2A included in the region 3 and the imaging device body 42 is calculated based on a measurement result of the distance sensor 102.

In the example shown in FIG. 1, an aspect in which each region 3 is imaged by the imaging device body 42 in a state where the optical axis OA of the imaging device body 42 is perpendicular to the wall surface 2A is shown. The plurality of regions 3 are imaged such that parts of the adjacent regions 3 overlap with each other. The reason why the plurality of regions 3 are imaged such that parts of the adjacent regions 3 overlap with each other is to combine the images 162 corresponding to the adjacent regions 3 based on a feature point included in the overlapping parts of the adjacent regions 3.

Hereinafter, a case where parts of the adjacent regions 3 overlap with each other is referred to as an overlap. In addition, a proportion of an area of an overlapping part to the entire area of each region 3 is referred to as an overlap ratio. The overlap ratio is set to a predetermined overlap ratio. The predetermined overlap ratio is set to, for example, a ratio at which an amount of the feature point that can be combined to compose the image 162 is obtained (for example, 30%).

In the example shown in FIG. 1, the plurality of regions 3 include the already imaged region 3 (that is, the region 3 imaged by the flight imaging apparatus 1) and the not-yet-imaged region 3 (that is, the region 3 to be imaged by the flight imaging apparatus 1). Hereinafter, in a case where the plurality of regions 3 are described in a distinguishable manner, the not-yet-imaged region 3 among the plurality of regions 3 is referred to as an "imaging target region 3A", and the already imaged region 3 among the plurality of regions 3 is referred to as an "imaged region 3B". The imaging target region 3A is an example of an "imaging target region" according to the technology of the present disclosure.

The flight imaging apparatus 1 can also image the plurality of regions 3 in an order in which a part of the imaging target region 3A and a part of the imaged region 3B, which has been imaged immediately before the imaging target region 3A (for example, one frame before), overlap each other. However, as will be described later, the flight imaging apparatus 1 can also image the plurality of regions 3 in an order in which a part of the imaging target region 3A and a part of the imaged region 3B, which is imaged immediately before the imaging target region 3A, do not overlap each other.

Figure 2:
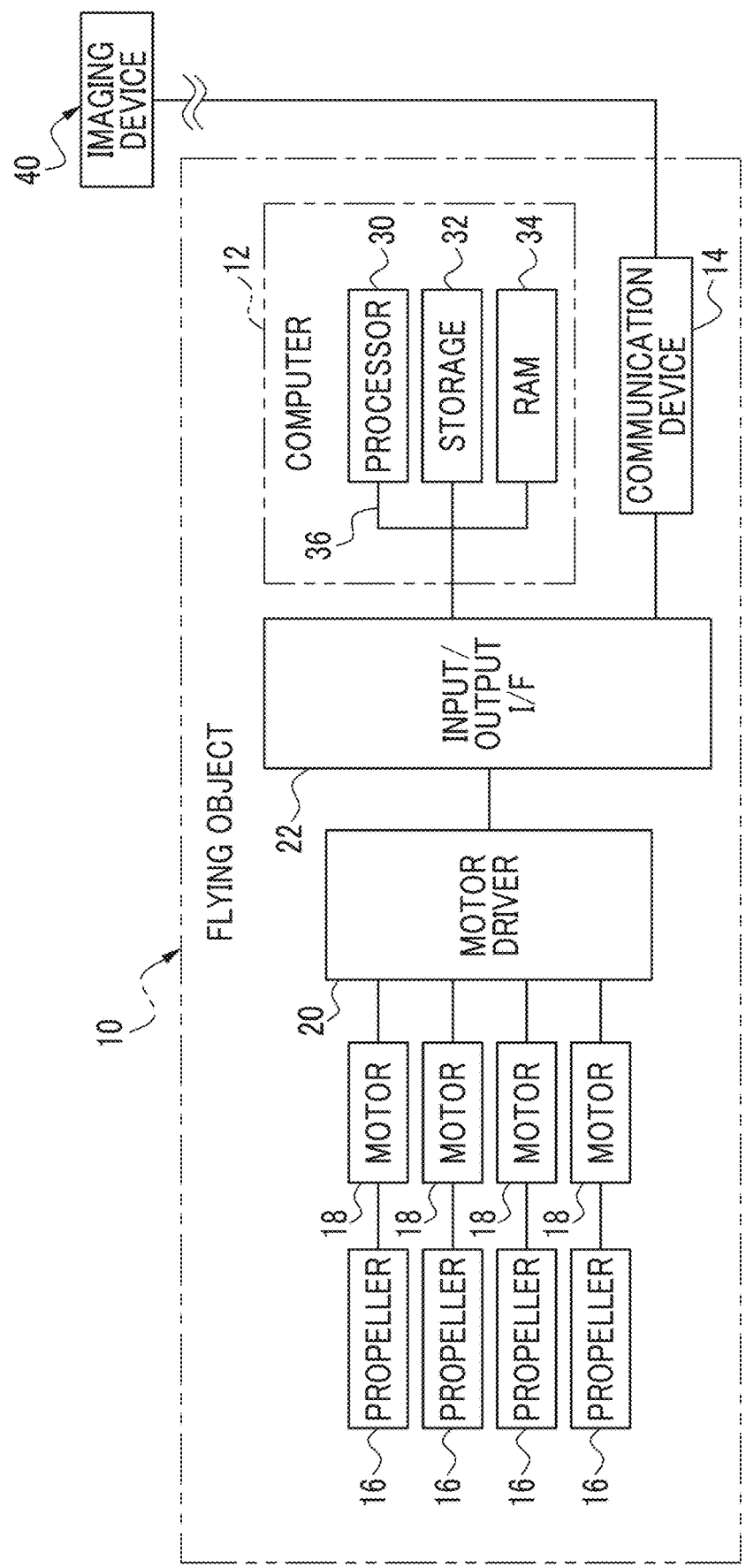
FIG. 2 is a block diagram showing an example of a hardware configuration of a flying object.

As shown in FIG. 2 as an example, the flying object 10 comprises a computer 12, a communication device 14, the plurality of propellers 16, a plurality of motors 18, a motor driver 20, and an input/output I/F 22.

The computer 12 comprises a processor 30, a storage 32, and a RAM 34. The processor 30, the storage 32, and the RAM 34 are connected to each other via a bus 36, and the bus 36 is connected to the input/output I/F 22.

The processor 30 includes, for example, a CPU and controls the entire flying object 10. The storage 32 is a non-volatile storage device that stores various programs, various parameters, and the like. Examples of the storage 32 include an HDD, an SSD, and the like. It should be noted that the HDD and the SSD are merely examples. A flash memory, a magnetoresistive memory, and/or a ferroelectric memory may be used instead of the HDD and/or the SSD or together with the HDD and/or the SSD.

The RAM 34 is a memory in which information is temporarily stored and is used as a work memory by the processor 30. Examples of the RAM 34 include a DRAM and/or an SRAM.

The communication device 14 is communicatably connected to the imaging device 40. Here, the communication device 14 is wirelessly communicatably connected to the imaging device 40 using a predetermined wireless communication standard. Examples of the predetermined wireless communication standard include Bluetooth (registered trademark). Here, while wireless communication is exemplified, the technology of the present disclosure is not limited thereto. Wired communication may be applied instead of wireless communication. The communication device 14 exchanges information with the imaging device 40. For example, the communication device 14 transmits information corresponding to a request from the processor 30 to the imaging device 40. In addition, the communication device 14 receives the information transmitted from the imaging device 40 and outputs the received information to the processor 30 via the bus 36.

Each propeller 16 is fixed to a rotating shaft of the motor 18. Each motor 18 rotates the propeller 16. The plurality of motors 18 are connected to the motor driver 20. The motor driver 20 is connected to the processor 30 via the input/output I/F 22 and the bus 36. The motor driver 20 individually controls the plurality of motors 18 in accordance with an instruction from the processor 30.

Figure 3:
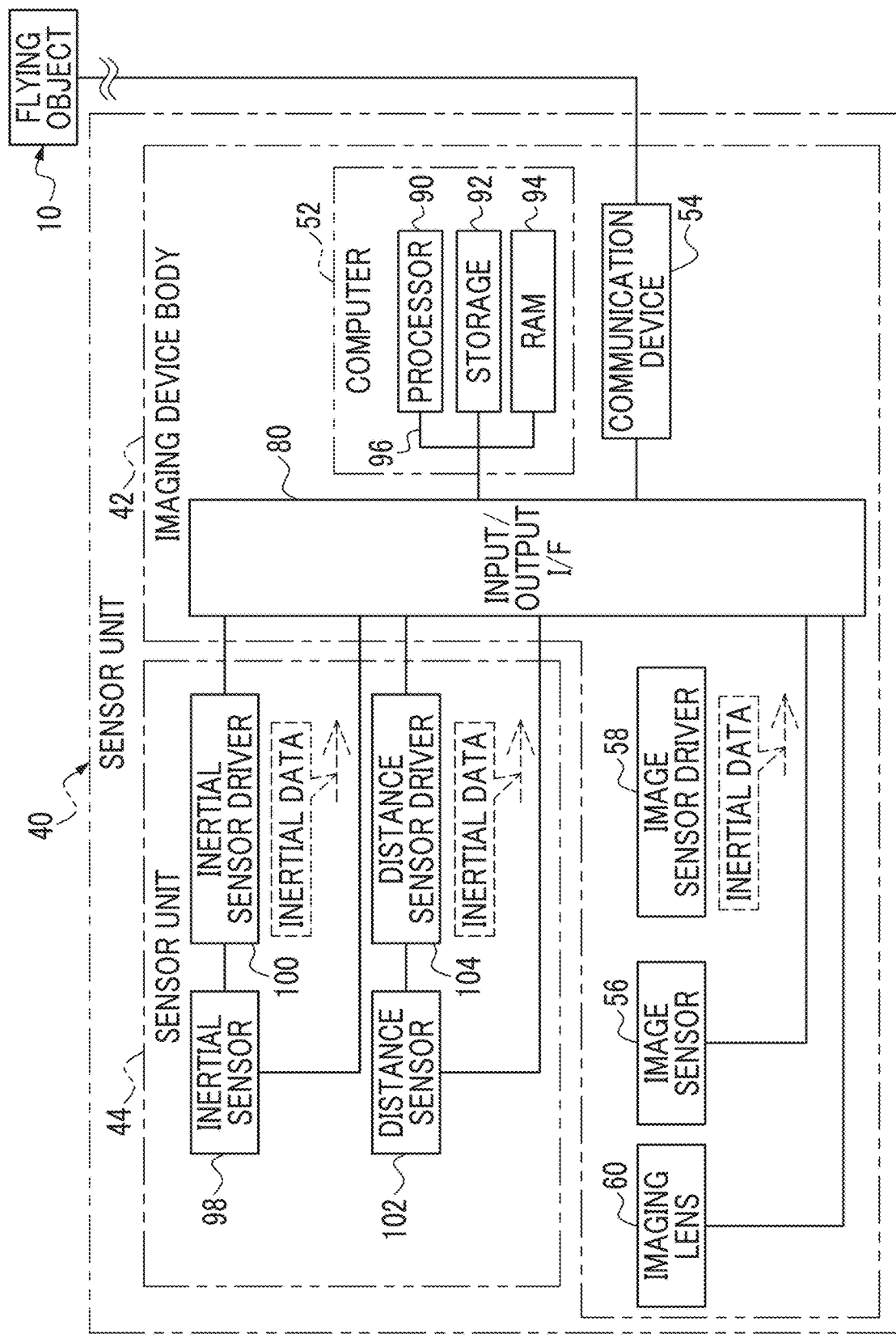
FIG. 3 is a block diagram showing an example of a hardware configuration of an imaging device.

As shown in FIG. 3 as an example, the imaging device body 42 comprises a computer 52, a communication device 54, an image sensor 56, an image sensor driver 58, an imaging lens 60, a focus actuator 62, a zoom actuator 64, an aperture stop actuator 66, a focus sensor 72, a zoom sensor 74, an aperture stop sensor 76, a controller 78, and an input/output I/F 80.

The computer 52 comprises a processor 90, a storage 92, and a RAM 94. The processor 90, the storage 92, and the RAM 94 are connected to each other via a bus 96, and the bus 96 is connected to the input/output I/F 80. The computer 52 is an example of an "imaging support device" and a "computer" according to the technology of the present disclosure. The processor 90 is an example of a "processor" according to the technology of the present disclosure.

Specific examples of types of a plurality of hardware resources for realizing the computer 52 (here, as an example, the processor 90, the storage 92, and the RAM 94) are the same as specific examples of types of a plurality of hardware resources for realizing the computer 12 shown in FIG. 2 (here, as an example, the processor 30, the storage 32, and the RAM 34), and the description thereof will be omitted. It goes without saying that the types of the plurality of hardware resources for realizing the computer 52 do not necessarily have to be the same as the types of the plurality of hardware resources for realizing the computer 12 shown in FIG. 2, and may be different types. The processor 90 controls the entire imaging device 40 in cooperation with the storage 92 and the RAM 94.

The communication device 54 is communicatably connected to the flying object 10. The communication device 54 is realized by using the same hardware resource as that of the communication device 14 (refer to FIG. 2) of the flying object 10. The communication device 54 exchanges information with the flying object 10. For example, the communication device 54 transmits information corresponding to a request from the processor 90 to the flying object 10. In addition, the communication device 54 receives information transmitted from the flying object 10 and outputs the received information to the processor 90 via the bus 96.

The sensor unit 44 comprises the inertial sensor 98, an inertial sensor driver 100, the distance sensor 102, and a distance sensor driver 104. The inertial sensor 98, the inertial sensor driver 100, the distance sensor 102, the distance sensor driver 104, the image sensor 56, the image sensor driver 58, and the controller 78 are connected to the processor 90 via the input/output I/F 80 and the bus 96.

The inertial sensor 98 is connected to the inertial sensor driver 100. The inertial sensor driver 100 controls the inertial sensor 98 in accordance with an instruction from the processor 90. The inertial sensor 98 detects an acceleration and an angular velocity acting on the imaging device 40 under the control of the inertial sensor driver 100, and outputs inertial data corresponding to the detected acceleration and angular velocity (for example, data indicating the acceleration itself and data indicating the angular velocity itself) to the processor 90.

The distance sensor 102 is connected to the distance sensor driver 104. The distance sensor driver 104 controls the distance sensor 102 in accordance with an instruction from the processor 90. The distance sensor 102 measures, for example, a distance between the imaging target region 3A in the wall surface 2A (refer to FIG. 1) and the distance sensor 102 under the control of the distance sensor driver 104, and outputs distance data corresponding to the measured distance (for example, data indicating the distance itself) to the processor 90.

The image sensor 56 is connected to the image sensor driver 58. The image sensor driver 58 controls the image sensor 56 in accordance with an instruction from the processor 90. The image sensor 56 is, for example, a CMOS image sensor. Here, while the CMOS image sensor is exemplified as the image sensor 56, the technology of the present disclosure is not limited thereto. Other image sensors may be used. The image sensor 56 images a subject (for example, a wall surface 2A of the object 2) under the control of the image sensor driver 58, and outputs the image data obtained by the imaging to the processor 90.

The imaging lens 60 is disposed on a subject side (object side) with respect to the image sensor 56. The imaging lens 60 takes in subject light, which is reflected light from the subject, and forms an image of the taken-in subject light on an imaging surface of the image sensor 56. The imaging lens 60 includes a plurality of optical elements (not shown) such as a focus lens, a zoom lens, and a stop. The imaging lens 60 is connected to the computer 52 via the input/output I/F 80. Specifically, the plurality of optical elements included in the imaging lens 60 are connected to the input/output I/F 80 via a driving mechanism (not shown) including a power source. A plurality of optical elements included in the imaging lens 60 operate under the control of the computer 52. In the imaging device 40, the control of focus, optical zoom, and shutter speed, or the like is realized by operating the plurality of optical elements included in the imaging lens 60.

Figure 4:
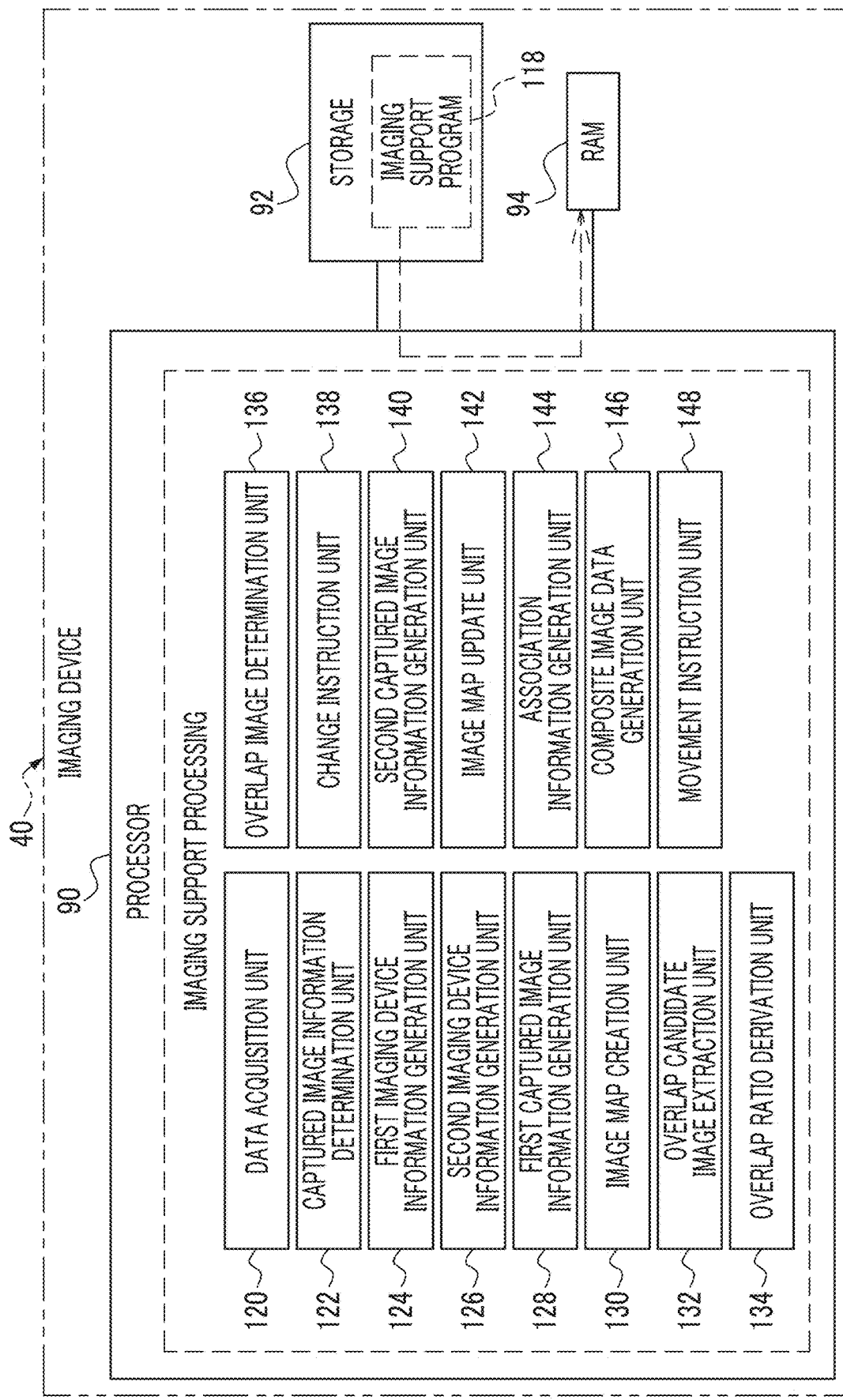
FIG. 4 is a block diagram showing an example of a functional configuration of the imaging device.

As shown in FIG. 4 as an example, the storage 92 stores an imaging support program 118. The imaging support program 118 is an example of a "program" according to the technology of the present disclosure. The processor 90 reads out the imaging support program 118 from the storage 92 and executes the read-out imaging support program 118 on the RAM 94. The processor 90 performs imaging support processing of combining the plurality of images 162 (refer to FIG. 1) in accordance with the imaging support program 118 executed on the RAM 94. The imaging support processing is realized by the processor 90 operating, in accordance with the imaging support program 118, as a data acquisition unit 120, a captured image information determination unit 122, a first imaging device information generation unit 124, a second imaging device information generation unit 126, a first captured image information generation unit 128, an image map creation unit 130, an overlap candidate image extraction unit 132, an overlap ratio derivation unit 134, an overlap image determination unit 136, a change instruction unit 138, a second captured image information generation unit 140, an image map update unit 142, an association information generation unit 144, a composite image data generation unit 146, and a movement instruction unit 148.

Figure 5:
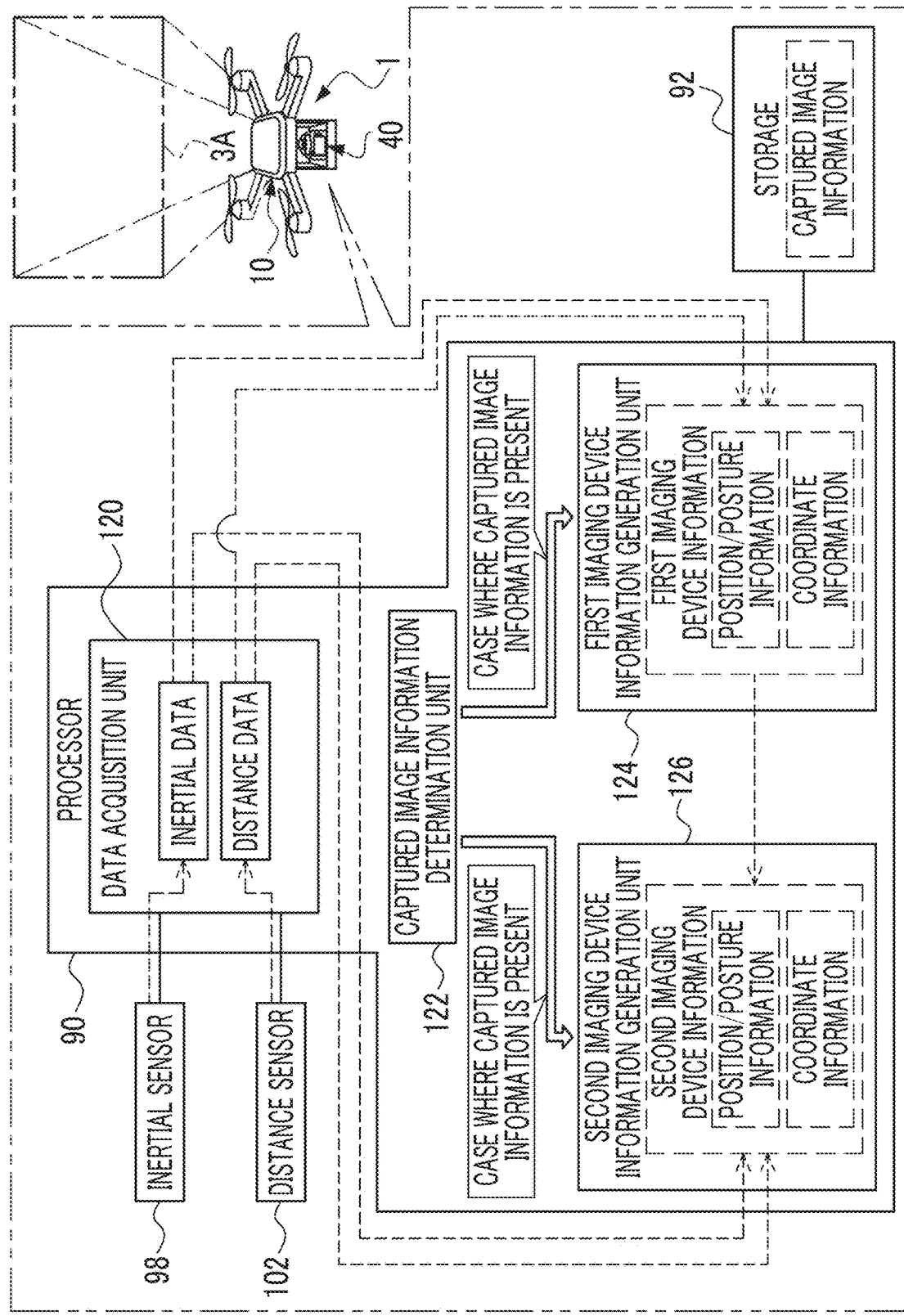
FIG. 5 is an explanatory diagram illustrating an example of a first operation of a processor.

As shown in FIG. 5 as an example, the data acquisition unit 120 acquires the inertial data input from the inertial sensor 98 to the processor 90 and the distance data input from the distance sensor 102 to the processor 90, respectively.

As will be described in detail later, captured image information is stored in the storage 92. The captured image information includes image data and the like. In the storage 92, there is a case where the captured image information is stored and a case where the captured image information is not stored. In that respect, the captured image information determination unit 122 determines whether or not the captured image information is stored in the storage 92.

In a case where the captured image information determination unit 122 determines that the captured image information is not stored in the storage 92, the first imaging device information generation unit 124 generates first imaging device information based on the inertial data and the distance data acquired by the data acquisition unit 120.

The first imaging device information includes position/posture information and coordinate information. The position/posture information includes position information indicating a position of the imaging device 40 and posture information indicating the posture of the imaging device 40. The position/posture information included in the first imaging device information is reference information that serves as a reference with respect to position/posture information included in second imaging device information, which will be described later. That is, the position of the imaging device 40 indicated by the position information among the position/posture information included in the first imaging device information is set as a reference position at the origin of a first three-dimensional coordinate system set with respect to the imaging device 40. In addition, the posture of the imaging device 40 indicated by the posture information among the position/posture information included in the first imaging device information is represented by an angle with respect to each coordinate axis of the first three-dimensional coordinate system described above as a reference posture.

In addition, the position/posture information includes distance information indicating a distance between the imaging target region 3A and the imaging device 40, and relative posture information indicating a posture of the imaging device 40 with respect to the imaging target region 3A. The distance information indicating the distance between the imaging target region 3A and the imaging device 40 is information corresponding to the distance data output from the distance sensor 102. The posture of the imaging device 40 with respect to the imaging target region 3A is represented by an angle with respect to each coordinate axis of a second three-dimensional coordinate system set on the wall surface 2A (refer to FIG. 1) of the object 2.

The coordinate information is information related to a position of the imaging target region 3A. Specifically, the coordinate information is information indicating the position of the imaging target region 3A, that is, information indicating coordinates of four vertices of the imaging target region 3A. The coordinate information is generated based on, for example, the position/posture information. That is, the coordinate information is generated based on the position information indicating the position of the imaging device 40, the distance information indicating the distance between the imaging target region 3A and the imaging device 40, the posture information indicating the posture of the imaging device 40 with respect to the imaging target region 3A, and the like.

It should be noted that, in a case of generating the coordinate information, another piece of position information related to the position of the imaging device 40 may be used instead of the position information indicating the position of the imaging device 40, or in addition to the position information indicating the position of the imaging device 40. In addition, in a case of generating the coordinate information, another piece of distance information related to the distance between the imaging target region 3A and the imaging device 40 may be used instead of the distance information indicating the distance between the imaging target region 3A and the imaging device 40, or in addition to the distance information indicating the distance between the imaging target region 3A and the imaging device 40. In addition, in a case of generating the coordinate information, another piece of posture information related to the posture of the imaging device 40 with respect to the imaging target region 3A may be used instead of the posture information indicating the posture of the imaging device 40 with respect to the imaging target region 3A, or in addition to the posture information indicating the posture of the imaging device 40 with respect to the imaging target region 3A.

One of the four vertices of the imaging target region 3A indicated by the coordinate information included in the first imaging device information is set at the origin of a two-dimensional coordinate system set on the wall surface 2A of the object 2. The coordinates of the remaining three vertices of the four vertices of the imaging target region 3A indicated by the coordinate information included in the first imaging device information are relative coordinates with respect to the origin of the two-dimensional coordinate system described above.

In a case where the captured image information determination unit 122 determines that the captured image information is stored in the storage 92, the second imaging device information generation unit 126 generates the second imaging device information based on the inertial data and the distance data acquired by the data acquisition unit 120 and the first imaging device information generated by the first imaging device information generation unit 124. The second imaging device information also includes the position/posture information and the coordinate information, as in the first imaging device information.

The position/posture information included in the second imaging device information is relative information with respect to the position/posture information included in the first imaging device information. That is, the position of the imaging device 40 indicated by the position information among the position/posture information included in the second imaging device information is a relative position with respect to the position of the imaging device 40 indicated by the position information among the position/posture information included in the first imaging device information. In addition, the posture of the imaging device 40 indicated by the posture information among the position/posture information included in the second imaging device information is a relative posture with respect to the posture of the imaging device 40 indicated by the posture information among the position/posture information included in the first imaging device information.

In addition, the position/posture information included in the second imaging device information also includes the distance information indicating the distance between the imaging target region 3A and the imaging device 40, and the relative posture information indicating the posture of the imaging device 40 with respect to the imaging target region 3A, as in the first imaging device information. The coordinates of the four vertices of the imaging target region 3A indicated by the coordinate information included in the second imaging device information are relative coordinates with respect to the origin of the two-dimensional coordinate system described above set on the wall surface 2A of the object 2.

The position of the imaging device 40 is, for example, a position with a center of the image sensor 56 as a reference (refer to FIG. 3). The position of the imaging device 40 is calculated based on the acceleration specified from the inertial data, taking into consideration a positional shift between the imaging device body 42 and the sensor unit 44. The posture of the imaging device 40 is calculated based on the angular velocity indicated by the inertial data. The distance between the imaging target region 3A and the imaging device 40 is, for example, a distance with the center of the image sensor 56 as a reference. The distance between the imaging target region 3A and the imaging device 40 is calculated based on the distance specified from the distance data (that is, the distance between the imaging target region 3A and the distance sensor 102) in consideration of the positional shift between the imaging device body 42 and the sensor unit 44.

The positional information included in the position/posture information is an example of "fourth position information" according to the technology of the present disclosure. The distance information included in the position/posture information is an example of "distance information" according to the technology of the present disclosure. The relative posture information included in the position/posture information is an example of "posture information" according to the technology of the present disclosure. The coordinate information included in the second imaging device information is an example of "second position information" and "third position information" according to the technology of the present disclosure.

Figure 6:
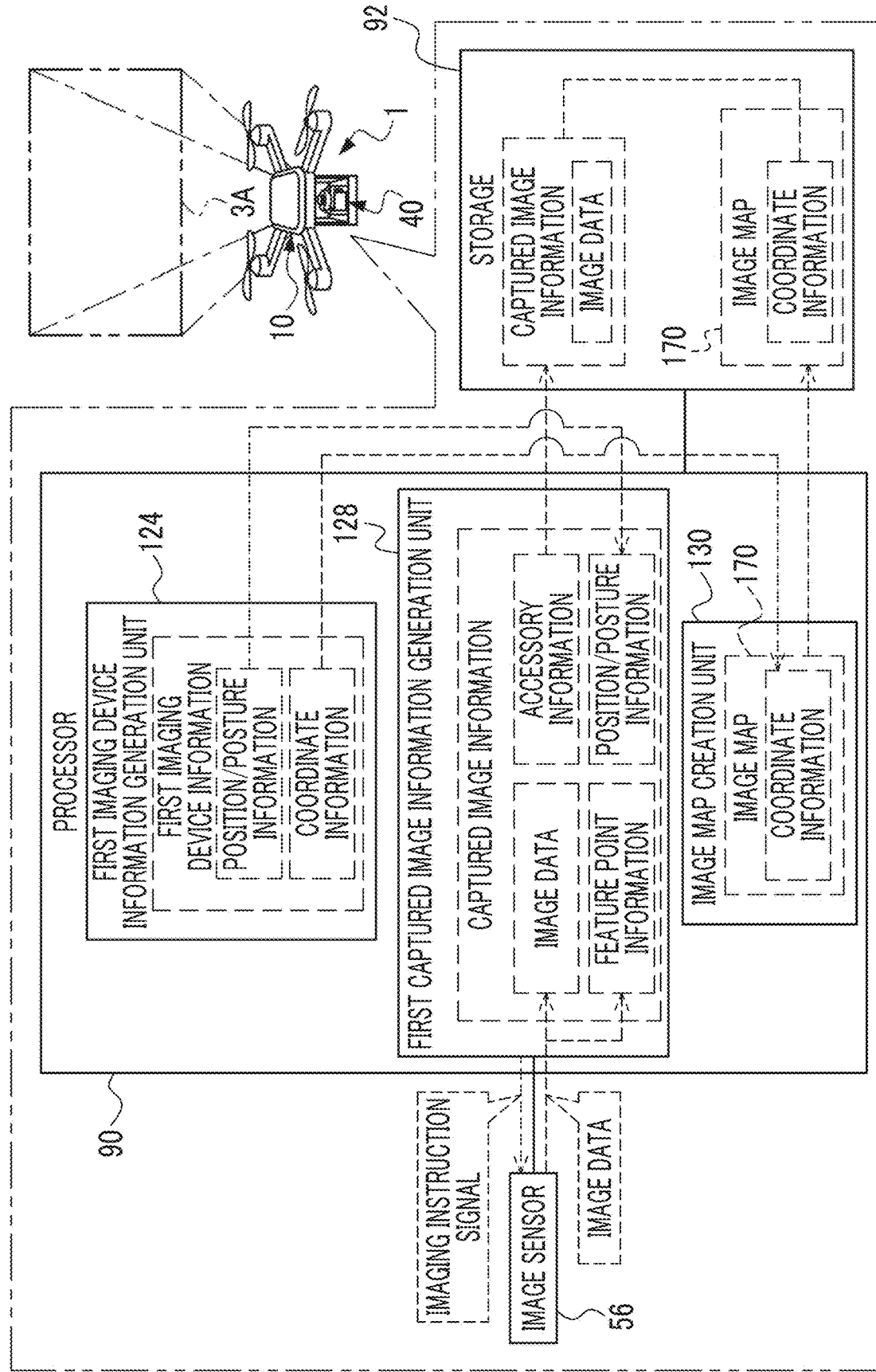
FIG. 6 is an explanatory diagram illustrating an example of a second operation of the processor.

As an example, FIG. 6 shows a state where the captured image information generated first is stored in the storage 92, and an image map 170 including the coordinate information included in the first imaging device information generated first is stored in the storage 92.

As shown in FIG. 6 as an example, the first captured image information generation unit 128 outputs an imaging instruction signal to the image sensor 56 to cause the image sensor 56 to image the imaging target region 3A. Then, the first captured image information generation unit 128 generates the captured image information based on the image data input from the image sensor 56 to the processor 90 and the position/posture information included in the first imaging device information generated by the first imaging device information generation unit 124.

The captured image information includes image data, feature point information, accessory information, and position/posture information. The image data is image data indicating an image obtained by imaging the imaging target region 3A with the image sensor 56 (hereinafter, referred to as a "captured image"). The feature point information is information indicating coordinates of a feature point included in the imaging target region 3A imaged by the image sensor 56. The coordinates of the feature point are derived, for example, by performing image processing (for example, high-frequency component extraction processing or the like) on the image data. The coordinates of the feature point are, for example, coordinates with any one of the four vertices of the imaging target region 3A as a reference.

The accessory information is, for example, information indicating a focal length and/or resolution. The focal length is derived based on a position of the zoom lens in the imaging lens 60 (refer to FIG. 3). The resolution is derived based on a position of the focus lens in the imaging lens 60 (refer to FIG. 3). As described above, the position/posture information is information generated by the first imaging device information generation unit 124. The captured image information generated by the first captured image information generation unit 128 is stored in the storage 92.

The image map creation unit 130 creates the image map 170 including the coordinate information included in the first imaging device information generated by the first imaging device information generation unit 124. The image map 170 is formed by a plurality of pieces of coordinate information (refer to FIG. 7) in a case where the imaging support processing proceeds, as will be described later. The image map 170 is an information group indicating coordinates of four vertices of a plurality of imaged regions 3B (refer to FIG. 1) corresponding to each piece of coordinate information, and further, a position of each of a plurality of captured images corresponding to each imaged region 3B. The image map 170 is an example of an "image map" according to the technology of the present disclosure.

The image map 170 created by the image map creation unit 130 is stored in the storage 92. The coordinate information included in the image map 170 is stored in the storage 92 in association with the captured image information generated by the first captured image information generation unit 128. It should be noted that the image map 170 may be information indicating a relative positional relationship between a plurality of captured images.

Figure 7:
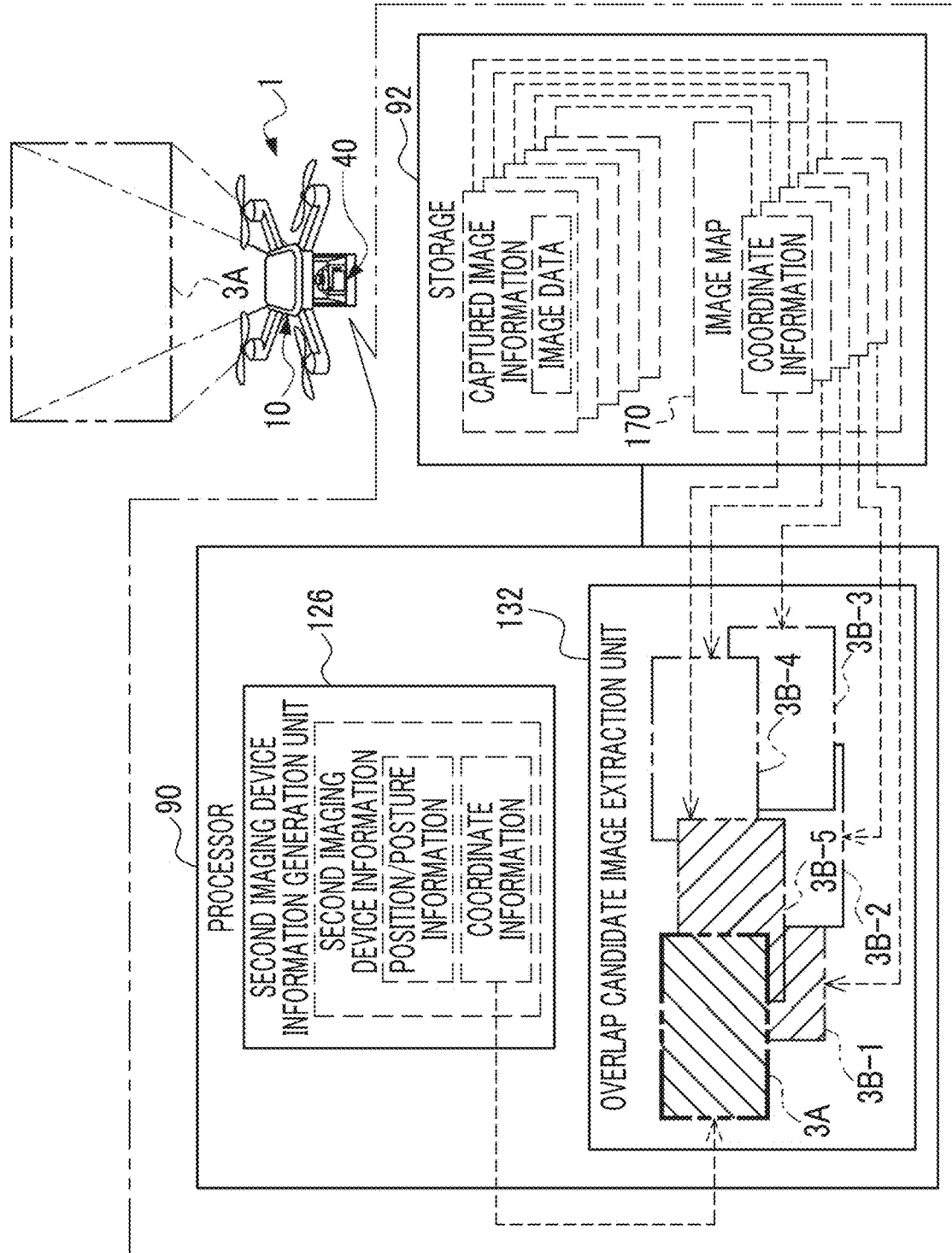
FIG. 7 is an explanatory diagram illustrating an example of a third operation of the processor.

As an example, FIG. 7 shows a state where a plurality of pieces of captured image information are stored in the storage 92 and the image map 170 includes the plurality of pieces of coordinate information as the imaging support processing proceeds, for convenience of description. In the example shown in FIG. 7, the number of the plurality of pieces of captured image information stored in the storage 92 and the number of the plurality of pieces of the coordinate information included in the image map 170 are both five.

The captured image information stored in the storage 92 first among the plurality of pieces of captured image information is the captured image information generated by the first captured image information generation unit 128 (refer to FIG. 6) described above. In addition, the captured image information stored in the storage 92 second or later among the plurality of pieces of captured image information is the captured image information generated by the second captured image information generation unit 140 (refer to FIG. 10) described later.

The coordinate information included in the image map 170 first among the plurality of pieces of coordinate information is the coordinate information included in the image map 170 by the image map creation unit 130 (refer to FIG. 6) described above. In addition, the coordinate information included in the image map 170 second or later among the plurality of pieces of coordinate information is the coordinate information included in the image map 170 by the image map update unit 142 (refer to FIG. 10) described later.

Each of the plurality of pieces of captured image information is associated with coordinate information. The image data included in each of the plurality of pieces of captured image information is image data indicating the captured image.

The overlap candidate image extraction unit 132 extracts, from among a plurality of captured images, an image that is a candidate to be overlapped with the imaging target region 3A (hereinafter, referred to as an "overlap candidate image") based on the plurality of pieces of coordinate information included in the image map 170 and on the coordinate information included in the second imaging device information generated by the second imaging device information generation unit 126. Specifically, the overlap candidate image extraction unit 132 compares the coordinates of the four vertices of the imaging target region 3A indicated by the coordinate information included in the second imaging device information with the coordinates of the four vertices of each imaged region 3B indicated by each piece of coordinate information included in the image map 170, and extracts the imaged region 3B that overlaps with the imaging target region 3A from the plurality of imaged regions 3B based on a comparison result.

Each imaged region 3B corresponds to the captured image indicated by the image data included in the captured image information. In FIG. 7, branch numbers 1 to 5 assigned to the reference numerals of the imaged regions 3B represent an order in which the imaged regions 3B are imaged. By extracting the imaged region 3B that overlaps with the imaging target region 3A from the plurality of imaged regions 3B, the overlap candidate image, which is a candidate to be overlapped with the imaging target region 3A, is extracted from the plurality of captured images.

In the example shown in FIG. 7, the imaged region 3B imaged first (hereinafter, also referred to as an "imaged region 3B-1") and the imaged region 3B imaged fifth (hereinafter, also referred to as an "imaged region 3B-5") overlap with the imaging target region 3A, and the captured image corresponding to the imaged region 3B-1 imaged first and the captured image corresponding to the imaged region 3B-5 imaged fifth are extracted as the overlap candidate images.

In a case where only one piece of captured image information is stored in the storage 92 at a stage before the plurality of pieces of captured image information are generated (refer to FIG. 6), the captured image corresponding to the one piece of captured image information is extracted as the overlap candidate image. On the other hand, in a case where the plurality of pieces of captured image information are generated and the plurality of pieces of captured image information are stored in the storage 92 (refer to FIG. 7), the overlap candidate image is extracted from the plurality of captured images respectively corresponding to the plurality of pieces of captured image information.

The captured image is an example of a "captured image" according to the technology of the present disclosure. The image map 170 is an example of "first position information" according to the technology of the present disclosure. The overlap candidate image is an example of an "overlap candidate image" according to the technology of the present disclosure.

Figure 8:
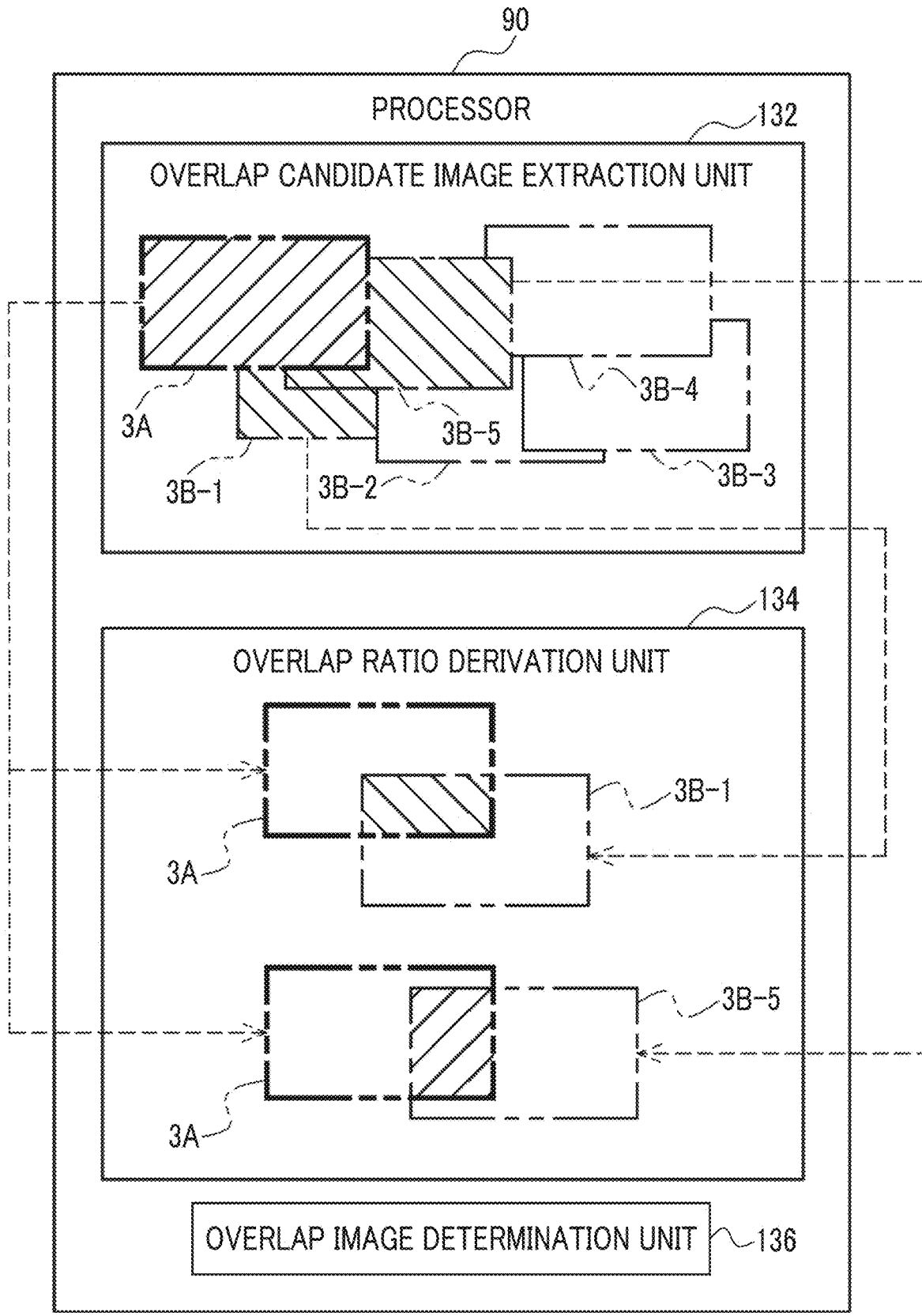
FIG. 8 is an explanatory diagram illustrating an example of a fourth operation of the processor.

As shown in FIG. 8 as an example, the overlap ratio derivation unit 134 derives an overlap ratio between the imaging target region 3A and the overlap candidate image extracted by the overlap candidate image extraction unit 132. Specifically, the overlap ratio derivation unit 134 calculates an overlap ratio between the imaging target region 3A and the imaged region 3B corresponding to the overlap candidate image.

In a method of calculating the overlap ratio between the imaging target region 3A and the imaged region 3B, for example, the overlap ratio between the imaging target region 3A and the imaged region 3B is calculated based on the coordinates of the four vertices of the imaging target region 3A and on the coordinates of the four vertices of the imaged region 3B. It should be noted that a live view image corresponding to the imaging target region 3A may be acquired, and a result of comparison of feature points between the live view image and the captured image may be used for the calculation of the overlap ratio between the imaging target region 3A and the imaged region 3B.

In the example shown in FIG. 8, the overlap ratio between the imaging target region 3A and the imaged region 3B-1 imaged first is calculated. In addition, in the example shown in FIG. 8, the overlap ratio between the imaging target region 3A and the imaged region 3B-5 imaged fifth is calculated.

The overlap image determination unit 136 determines whether or not the captured image in which the overlap ratio is equal to or greater than the predetermined overlap ratio (hereinafter, referred to as an "overlap image") is present in the overlap candidate images from which the overlap ratio is derived by the overlap ratio derivation unit 134.

Specifically, the overlap image determination unit 136 determines that the captured image corresponding to the imaged region 3B is the overlap image in a case where the overlap ratio of the imaged region 3B in which the overlap ratio with the imaging target region 3A is calculated by the overlap ratio derivation unit 134 is equal to or greater than the predetermined overlap ratio. In addition, the overlap image determination unit 136 determines that the captured image corresponding to the imaged region 3B is not the overlap image in a case where the overlap ratio of the imaged region 3B in which the overlap ratio with the imaging target region 3A is calculated by the overlap ratio derivation unit 134 is less than the predetermined overlap ratio.

Figure 9:
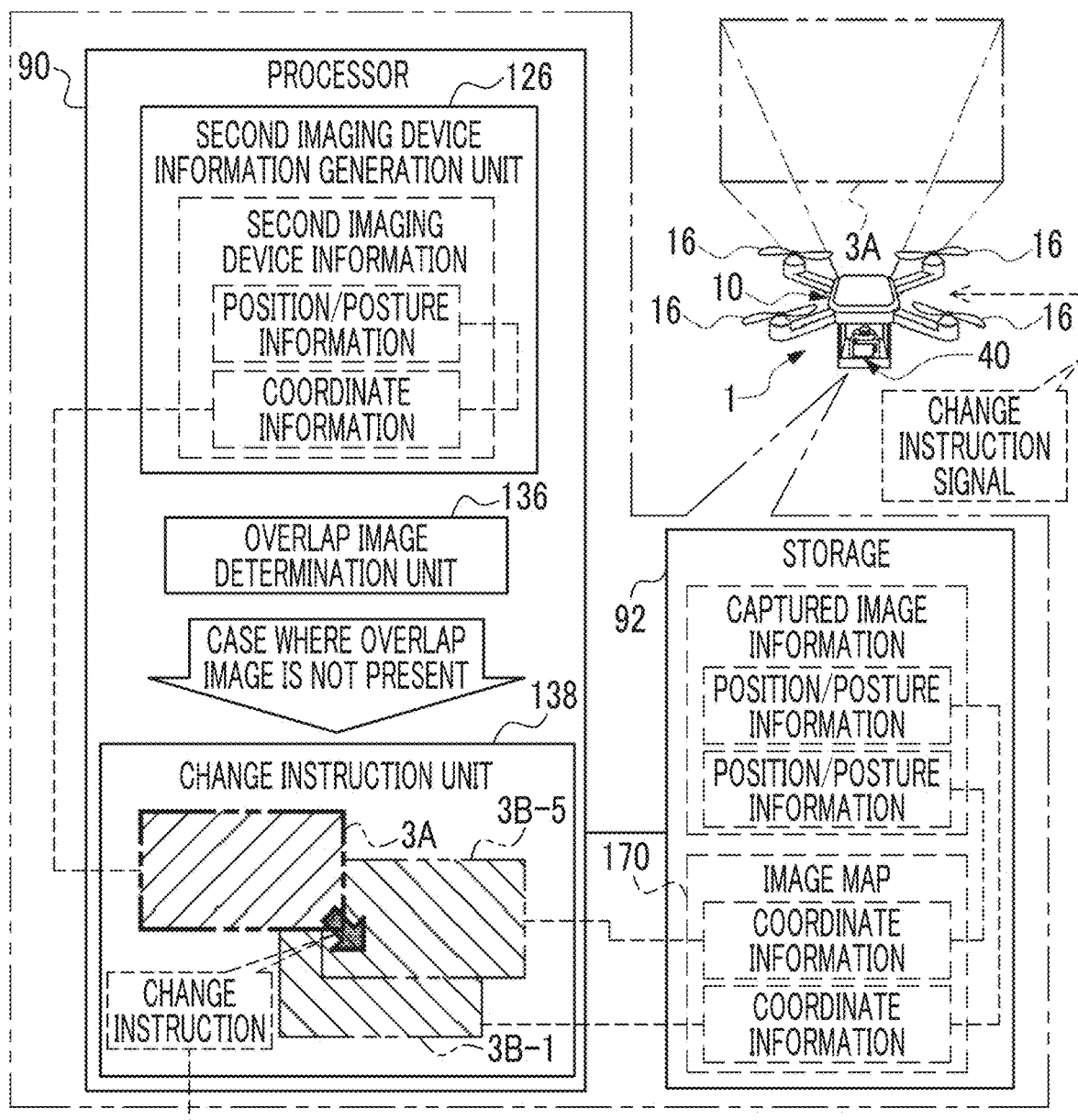
FIG. 9 is an explanatory diagram illustrating an example of a fifth operation of the processor.

As shown in FIG. 9 as an example, the change instruction unit 138 generates a change instruction in a case where the overlap image determination unit 136 determines that the overlap image is not present. The change instruction is, for example, an instruction to change the position and/or the posture of the imaging device 40 in a direction and/or an orientation in which the imaging target region 3A approaches the imaged region 3B corresponding to the overlap candidate image.

Specifically, the change instruction unit 138 specifies a positional relationship between the imaging target region 3A and the imaged region 3B corresponding to the overlap candidate image based on the coordinate information corresponding to the imaging target region 3A and on the coordinate information corresponding to the overlap candidate image. In addition, the change instruction unit 138 generates the change instruction based on the specified positional relationship, the position/posture information included in the second imaging device information generated by the second imaging device information generation unit 126 in correspondence with the imaging target region 3A, and the position/posture information included in the captured image information stored in the storage 92 in correspondence with the overlap candidate image. Then, the change instruction unit 138 outputs a change instruction signal indicating the generated change instruction to, for example, the flying object 10. The change instruction signal is an example of a "change instruction signal" according to the technology of the present disclosure.

The flying object 10 changes its position and/or posture by adjusting rotation speeds of the plurality of propellers 16 based on the change instruction signal input from the imaging device 40. The position and/or the posture of the imaging device 40 is changed by changing the position and/or the posture of the flying object 10, and further, the position of the imaging target region 3A (for example, the coordinates of the four vertices of the imaging target region 3A) of the imaging device 40 is changed.

It should be noted that the change instruction unit 138 may output the change instruction signal to the transmitter (not shown) and/or the base station (not shown) that transmits the flight instruction signal to the flying object 10. In a case where the change instruction signal is output to the transmitter, the change instruction indicated by the change instruction signal may be displayed on a display (not shown) provided in the transmitter. In addition, a frame indicating the imaging target region 3A, a frame indicating the imaged region 3B corresponding to the overlap candidate image, and the overlap ratio derived by the overlap ratio derivation unit 134 may be displayed on the display. Then, the transmitter may transmit the flight instruction signal to the flying object 10 based on the change instruction signal. In addition, in a case where the change instruction signal is output to the base station, the base station may transmit the flight instruction signal to the flying object 10 based on the change instruction signal.

In addition, the change instruction may be a change permission instruction to permit the change. In a case where the change instruction signal is output to the transmitter, the change permission instruction indicated by the change instruction signal may be displayed on the display (not shown) provided in the transmitter. In addition, the frame indicating the imaging target region 3A, the frame indicating the imaged region 3B corresponding to the overlap candidate image, and the overlap ratio derived by the overlap ratio derivation unit 134 may be displayed on the display. Then, the transmitter may transmit the flight instruction signal to the flying object 10 based on a command granted by a user to the transmitter based on the change permission instruction displayed on the display.

Figure 10:
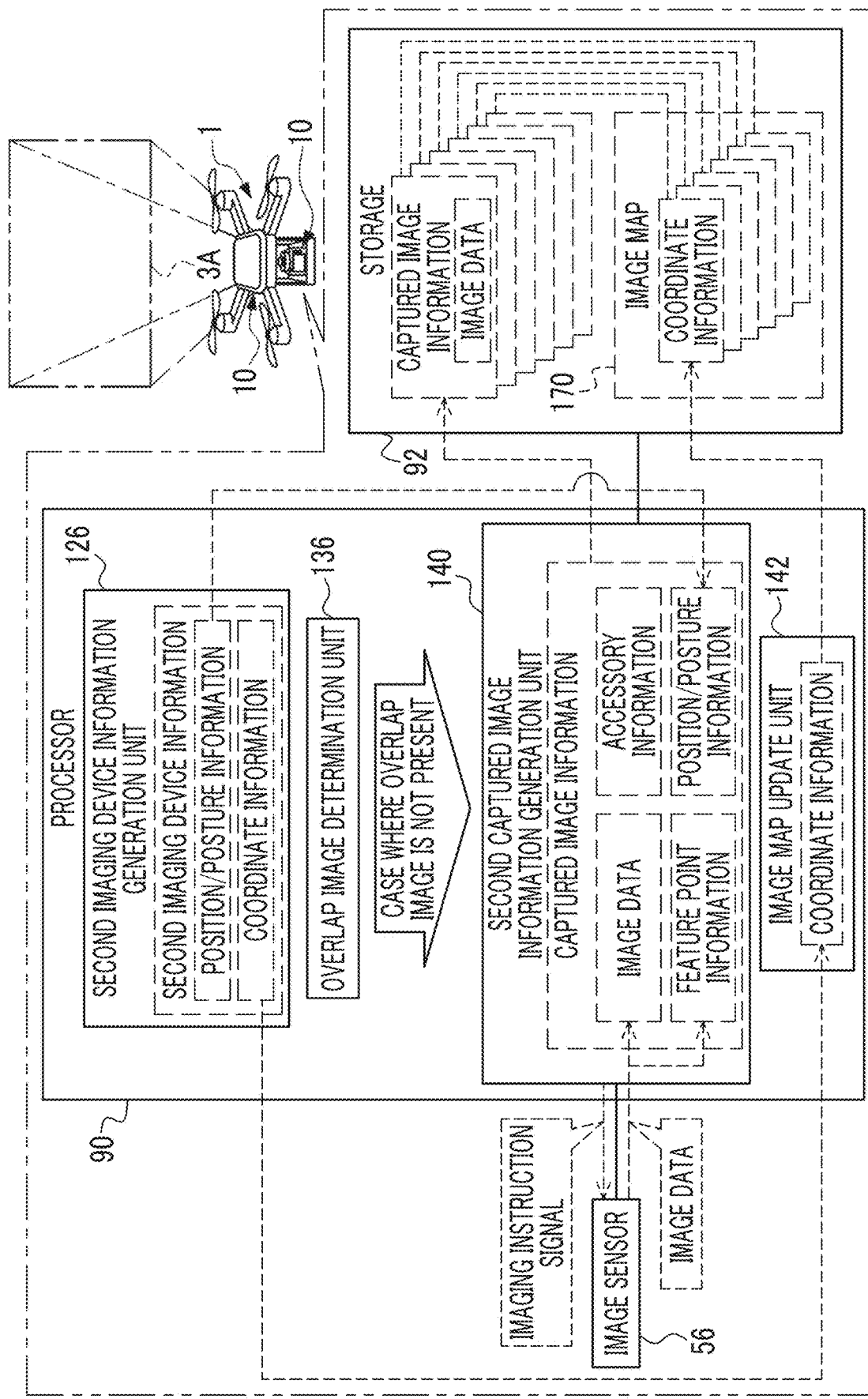
FIG. 10 is an explanatory diagram illustrating an example of a sixth operation of the processor.

As shown in FIG. 10 as an example, in a case where the overlap image determination unit 136 determines that the overlap image is present, the second captured image information generation unit 140 outputs the imaging instruction signal to the image sensor 56 to cause the image sensor 56 to capture the imaging target region 3A. Then, the second captured image information generation unit 140 generates the captured image information based on the image data input from the image sensor 56 to the processor 90 and on the position/posture information included in the second imaging device information generated by the second imaging device information generation unit 126.

The captured image information generated by the second captured image information generation unit 140 is the same as the captured image information generated by the first captured image information generation unit 128, and includes the image data, the feature point information, the accessory information, and the position/posture information. The captured image information generated by the second captured image information generation unit 140 is stored in the storage 92. The imaging instruction signal output to the image sensor 56 by the second captured image information generation unit 140 is an example of a "first signal" and an "imaging instruction signal" according to the technology of the present disclosure.

The imaging instruction signal may be output to the transmitter (not shown) and/or the base station (not shown) that transmits the flight instruction signal to the flying object 10. In addition, in a case where the imaging instruction signal is output to the transmitter, the imaging instruction indicated by the imaging instruction signal may be displayed on the display (not shown) provided in the transmitter. Then, the transmitter may transmit the imaging instruction signal to the imaging device 40. In addition, in a case where the imaging instruction signal is output to the base station, the base station may transmit the imaging instruction signal to the imaging device 40 based on the imaging instruction signal.

In addition, the imaging instruction may be an imaging permission instruction to permit the imaging. In a case where the imaging instruction signal is output to the transmitter, the imaging permission instruction indicated by the imaging instruction signal may be displayed on the display (not shown) provided in the transmitter. Then, the transmitter may transmit the imaging instruction signal to the imaging device 40 based on a command granted by the user to the transmitter based on the imaging permission instruction displayed on the display.

The image map update unit 142 acquires the coordinate information included in the second imaging device information generated by the second imaging device information generation unit 126. Then, the image map update unit 142 updates the image map 170 by including the acquired coordinate information in the image map 170. The coordinate information included in the image map 170 is stored in the storage 92 in association with the captured image information generated by the second captured image information generation unit 140.

Figure 11:
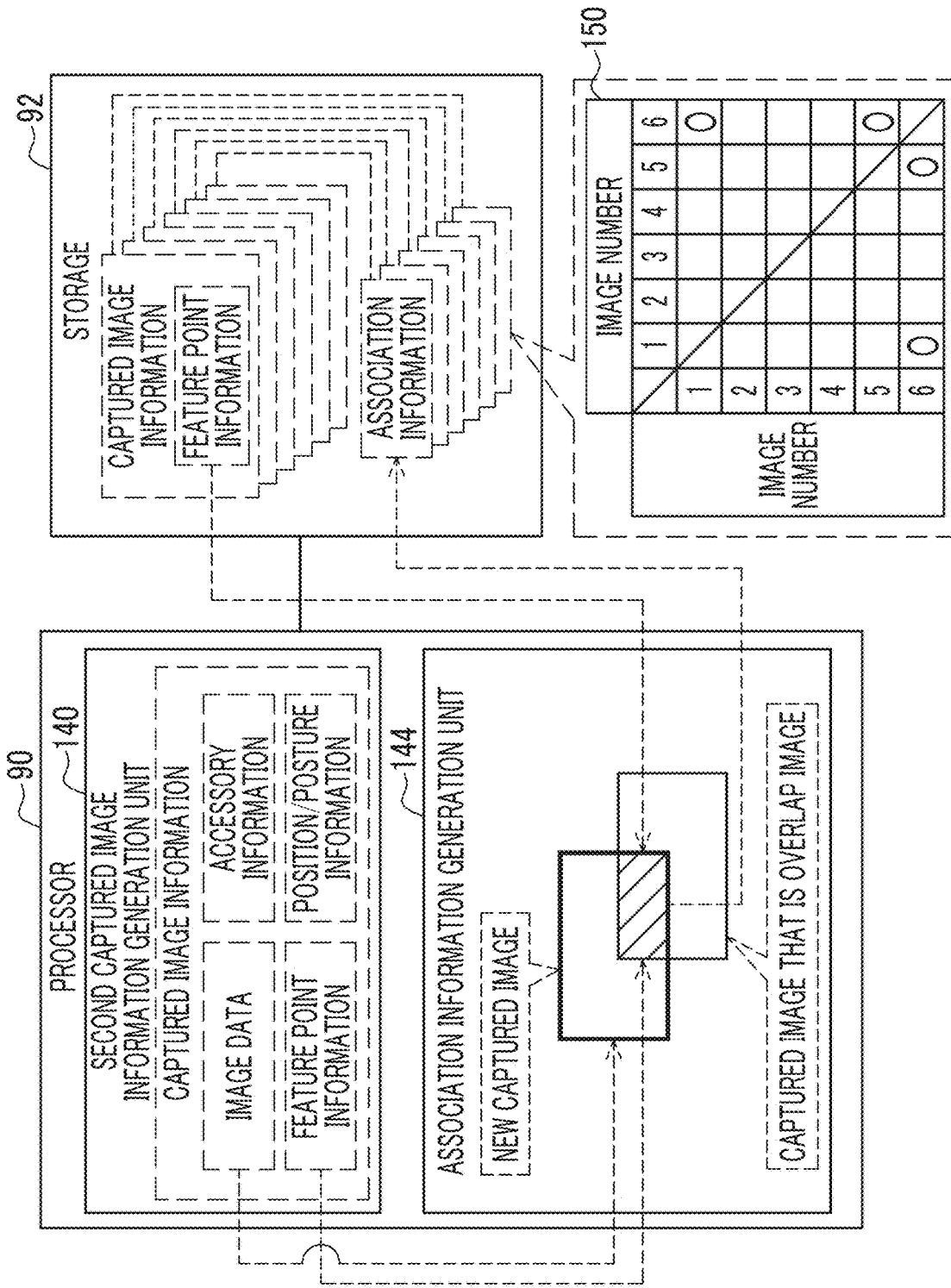
FIG. 11 is an explanatory diagram illustrating an example of a seventh operation of the processor.

As shown in FIG. 11 as an example, the association information generation unit 144 generates association information, which is information for associating two captured images, that is, the captured image that is the overlap image with the captured image indicated by the image data included in the captured image information generated by the second captured image information generation unit 140 (that is, a new captured image).

Specifically, the association information generation unit 144 acquires the feature point information included in the captured image information generated by the second captured image information generation unit 140 and the feature point information included in the captured image information stored in the storage 92 in association with the overlap image. Then, the association information generation unit 144 extracts the feature point included in common in the two captured images based on the acquired two pieces of feature point information, and generates association information including information indicating the extracted feature points. The association information generated by the association information generation unit 144 is stored in the storage 92 in association with the captured image information corresponding to each of the two captured images.

As an example, FIG. 11 shows a table 150 schematically showing a relationship between a plurality of pieces of association information stored in the storage 92 and the plurality of pieces of captured image information stored in the storage 92. An "image number" shown in the table 150 indicates an order in which the plurality of captured images are acquired. In addition, a "○ (circle mark)" shown in the table 150 indicates that the association information corresponding to the captured image is present, and a "blank" in the table 150 indicates that the association information corresponding to the captured image is not present.

In the example shown in FIG. 11, the table 150 indicates that the association information for associating the captured image acquired first with the captured image acquired sixth is present. In addition, the table 150 indicates that the association information for associating the captured image acquired fifth with the captured image acquired sixth is present.

The captured image, which is the overlap image, is an example of a "first captured image" according to the technology of the present disclosure. The captured image indicated by the image data included in the captured image information generated by the second captured image information generation unit 140 is an example of a "second captured image" according to the technology of the present disclosure. The association information is an example of "association information" according to the technology of the present disclosure. The information indicating the feature point extracted by the association information generation unit 144 (that is, the information related to the feature point included in common in the two captured images) is an example of "feature point information" according to the technology of the present disclosure.

Figure 12:
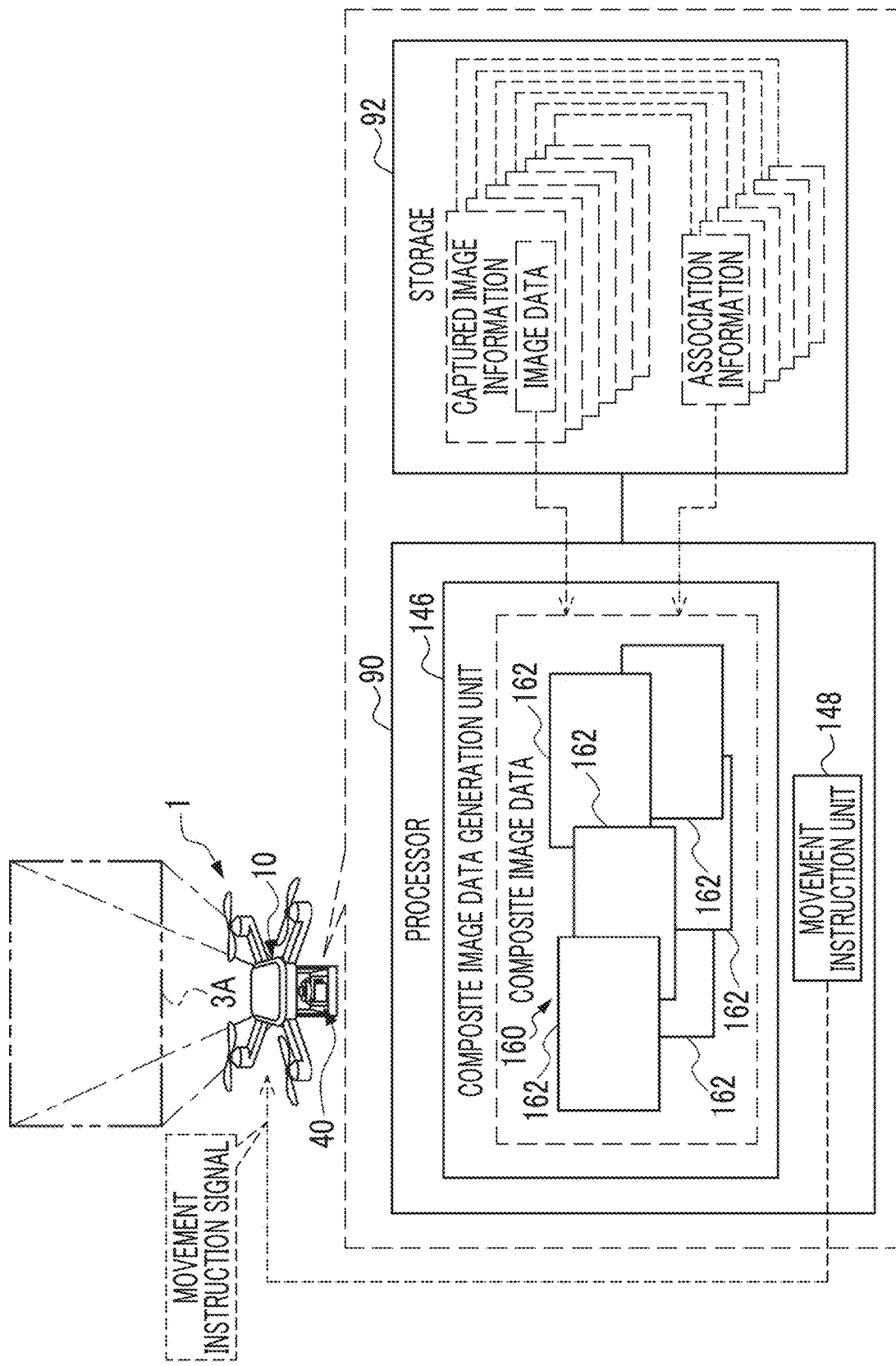
FIG. 12 is an explanatory diagram illustrating an example of an eighth operation of the processor.

As shown in FIG. 12 as an example, the composite image data generation unit 146 acquires the plurality of pieces of captured image information and the plurality of pieces of association information from the storage 92. Then, the composite image data generation unit 146 generates composite image data indicating the composite image 160 based on the image data included in the plurality of pieces of captured image information and on the plurality of pieces of association information.

The composite image 160 is an image obtained by combining the captured images corresponding to the association information (that is, the captured images having parts that overlap) with respect to the plurality of captured images indicated by the image data included in the plurality of pieces of captured image information. The composite image 160 is a panoramic image as an example. The composite image 160 is an example of a "composite image" according to the technology of the present disclosure. As an example, FIG. 12 shows a state where the composite image 160 is generated with the plurality of images 162. Each image 162 is a captured image indicated by the image data included in the captured image information.

The movement instruction unit 148 outputs a movement instruction signal indicating a movement instruction to the flying object 10. The flying object 10 moves based on the movement instruction signal, so that a new region of the wall surface 2A (refer to FIG. 1) is set as the imaging target region 3A.

It should be noted that the movement instruction unit 148 may extract a region of the wall surface 2A, which has not yet been imaged in the wall surface 2A, based on the plurality of pieces of coordinate information included in the image map 170, and may generate a movement instruction to move the imaging device 40 to a position in which the extracted region is the imaging target region 3A (that is, a position designation instruction to designate a position to which the imaging device 40 is moved). Then, in a case where the movement instruction signal indicating the position designation instruction is input to the flying object 10, the flying object 10 may move the imaging device 40 to the position designated by the position designation instruction by flying in accordance with the movement instruction signal.

In addition, the movement instruction unit 148 may output the movement instruction signal to the transmitter (not shown) and/or the base station (not shown) that transmits the flight instruction signal to the flying object 10. In a case where the movement instruction signal is output to the transmitter, the movement instruction indicated by the movement instruction signal may be displayed on the display (not shown) provided in the transmitter. Then, the transmitter may transmit the flight instruction signal to the flying object 10. In addition, in a case where the movement instruction signal is output to the base station, the base station may transmit the flight instruction signal to the flying object 10 based on the movement instruction signal.

In addition, the movement instruction may be a movement permission instruction to permit the movement. In a case where the movement instruction signal is output to the transmitter, the movement permission instruction indicated by the movement instruction signal may be displayed on the display (not shown) provided in the transmitter. In addition, the composite image 160 including the plurality of images 162 may be displayed on the display. Then, the transmitter may transmit the flight instruction signal to the flying object 10 based on a command granted by the user to the transmitter based on the movement permission instruction displayed on the display.

Figure 13:
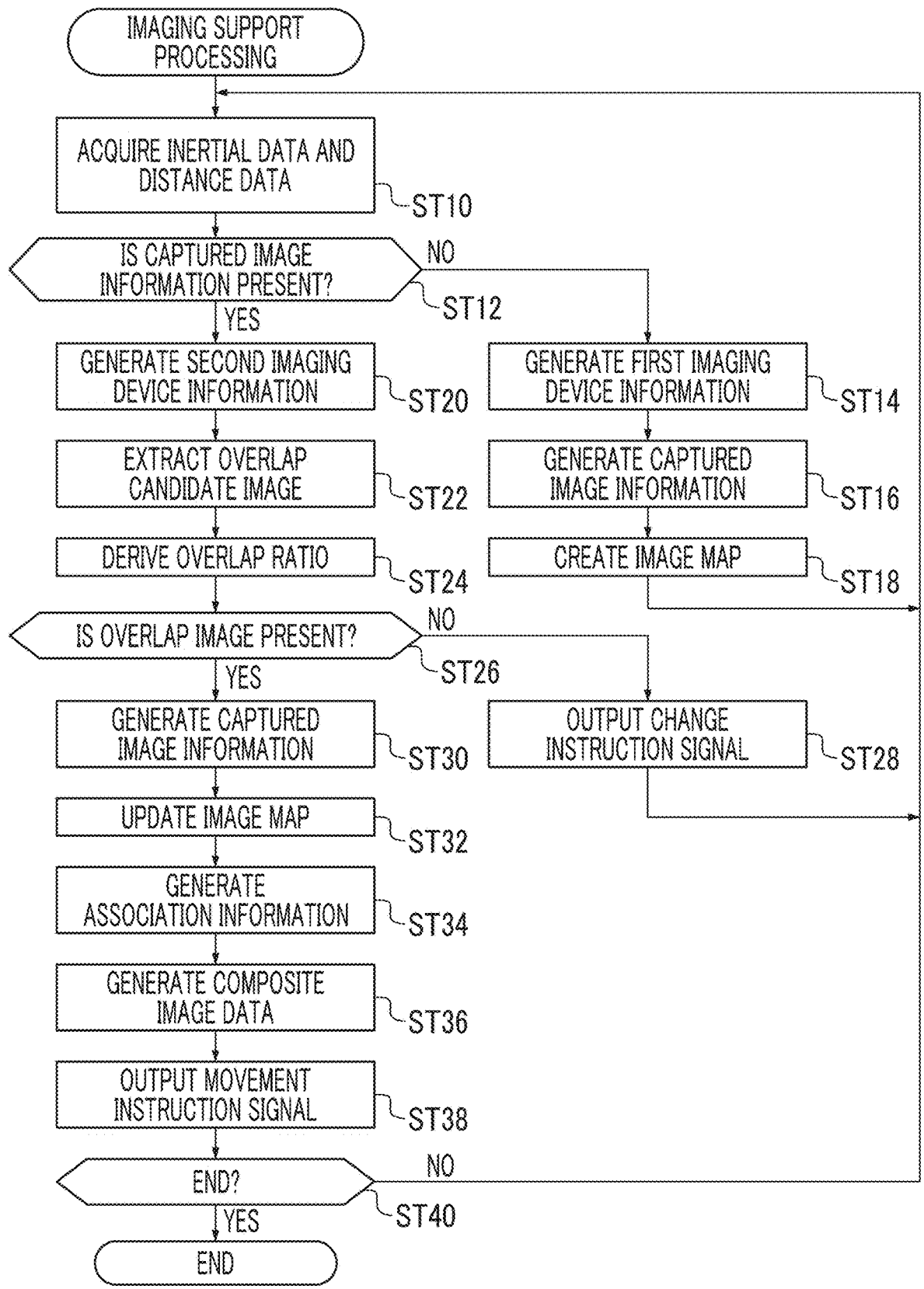
FIG. 13 is a flowchart showing an example of a flow of imaging support processing.

Next, an action of the flight imaging apparatus 1 according to the present embodiment will be described with reference to FIG. 13. FIG. 13 shows an example of a flow of imaging support processing according to the present embodiment.

In the imaging support processing shown in FIG. 13, first, in step ST10, the data acquisition unit 120 acquires the inertial data input from the inertial sensor 98 to the processor 90 and the distance data input from the distance sensor 102 to the processor 90 (refer to FIG. 5). After the processing in step ST10 is executed, the imaging support processing shifts to step ST12.

In step ST12, the captured image information determination unit 122 determines whether or not the captured image information related to the captured image is stored in the storage 92 (refer to FIG. 5). In step ST12, in a case where the captured image information is not stored in the storage 92, a negative determination is made, and the imaging support processing shifts to step ST14. In step ST12, in a case where the captured image information is stored in the storage 92, a positive determination is made, and the imaging support processing shifts to step ST20.

In step ST14, the first imaging device information generation unit 124 generates the first imaging device information including the position/posture information and the coordinate information related to the imaging device 40 based on the inertial data and the distance data acquired in step ST10 (refer to FIG. 5). After the processing in step ST14 is executed, the imaging support processing shifts to step ST16.

In step ST16, the first captured image information generation unit 128 causes the image sensor 56 mounted on the imaging device 40 to image the imaging target region 3A. Then, the first captured image information generation unit 128 generates the captured image information related to the captured image based on the image data input from the image sensor 56 to the processor 90 and on the position/posture information included in the first imaging device information generated in step ST14 (refer to FIG. 6). The captured image information is stored in the storage 92. After the processing in step ST16 is executed, the imaging support processing shifts to step ST18.

In step ST18, the image map creation unit 130 creates the image map 170 including the coordinate information included in the first imaging device information generated in step ST14 (refer to FIG. 6). The coordinate information included in the image map 170 is stored in the storage 92 in association with the captured image information generated by the first captured image information generation unit 128. After the processing in step ST18 is executed, the imaging support processing shifts to step ST10.

In step ST20, the second imaging device information generation unit 126 generates the second imaging device information including the position/posture information and the coordinate information related to the imaging device 40 based on the inertial data and the distance data acquired in step ST10 and the first imaging device information generated in step ST14 (refer to FIG. 5). After the processing in step ST20 is executed, the imaging support processing shifts to step ST22.

In step ST22, the overlap candidate image extraction unit 132 extracts the overlap candidate image, which is the candidate to be overlapped with the imaging target region 3A of the imaging device 40, based on the coordinate information included in the image map 170 and on the coordinate information included in the second imaging device information generated in step ST20 (refer to FIG. 7). In a first time of step ST22, the captured image corresponding to the one piece of captured image information stored in the storage 92 is extracted as the overlap candidate image. In a second time and subsequent times of step ST22, the overlap candidate image is extracted from the plurality of captured images respectively corresponding to the plurality of pieces of captured image information stored in the storage 92. After the processing in step ST22 is executed, the imaging support processing shifts to step ST24.

In step ST24, the overlap ratio derivation unit 134 derives the overlap ratio between the imaging target region 3A of the imaging device 40 and the overlap candidate image extracted in step ST22 (refer to FIG. 8). After the processing in step ST24 is executed, the imaging support processing shifts to step ST26.

In step ST26, the overlap image determination unit 136 determines whether or not the overlap image having the overlap ratio equal to or greater than the predetermined overlap ratio is present in the overlap candidate images of which the overlap ratio is derived in step ST24 (refer to FIG. 9). In step ST26, in a case where the overlap image is not present, a negative determination is made, and the imaging support processing shifts to step ST28. In step ST26, in a case where the overlap image is present, a positive determination is made, and the imaging support processing shifts to step ST30.

In step ST28, the change instruction unit 138 generates the change instruction, which is the instruction to change the position and/or the posture of the imaging device 40, based on the coordinate information included in the second imaging device information generated in step ST20 and on the coordinate information corresponding to the overlap candidate image extracted in step ST22 (refer to FIG. 9). Then, the change instruction unit 138 outputs the change instruction signal indicating the generated change instruction to, for example, the flying object 10. As a result, the position and/or the posture of the imaging device 40 is changed by changing the position and/or the posture of the flying object 10, and further, the position of the imaging target region 3A (for example, the coordinates of the four vertices of the imaging target region 3A) of the imaging device 40 is changed. After the processing in step ST28 is executed, the imaging support processing shifts to step ST10.

In step ST30, the second captured image information generation unit 140 causes the image sensor 56 to image the imaging target region 3A (refer to FIG. 10). Then, the second captured image information generation unit 140 generates the captured image information based on the image data input from the image sensor 56 to the processor 90 and on the position/posture information included in the second imaging device information generated in step ST20. The captured image information is stored in the storage 92. After the processing in step ST30 is executed, the imaging support processing shifts to step ST32.

In step ST32, the image map update unit 142 updates the image map 170 by acquiring the coordinate information included in the second imaging device information generated in step ST20 and including the acquired coordinate information in the image map 170 (refer to FIG. 10). The coordinate information included in the image map 170 is stored in the storage 92 in association with the captured image information generated by the second captured image information generation unit 140. After the processing in step ST32 is executed, the imaging support processing shifts to step ST34.

In step ST34, the association information generation unit 144 generates the association information, which is the information for associating the two captured images, that is, the captured image determined to be the overlap image in step ST26 with the captured image indicated by the image data included in the captured image information generated in step ST30 (refer to FIG. 11). The association information is stored in the storage 92 in association with the captured image information corresponding to each of the two captured images. After the processing in step ST34 is executed, the imaging support processing shifts to step ST36.

In step ST36, the composite image data generation unit 146 acquires the plurality of pieces of captured image information and the plurality of pieces of association information from the storage 92 (refer to FIG. 12). Then, the composite image data generation unit 146 generates the composite image data based on the image data included in the plurality of pieces of captured image information and on the plurality of pieces of association information. As a result, the composite image 160 indicated by the composite image data is obtained. After the processing in step ST36 is executed, the imaging support processing shifts to step ST38.

In step ST38, the movement instruction unit 148 outputs the movement instruction signal indicating the movement instruction to the flying object 10 (refer to FIG. 12). As a result, the flying object 10 moves, so that a new region of the wall surface 2A (refer to FIG. 1) is set as the imaging target region 3A. After the processing in step ST38 is executed, the imaging support processing shifts to step ST40.

In step ST40, the processor 90 determines whether or not a condition for ending the imaging support processing is satisfied. Examples of a condition for ending the imaging support processing include a condition that the user ends the imaging support processing, and a condition that the number of the captured images reaches the number designated by the user. In step ST40, in a case where the condition for ending the imaging support processing is not satisfied, a negative determination is made, and the imaging support processing shifts to step ST10. In step ST40, in a case where the condition for ending the imaging support processing is satisfied, a positive determination is made, and the imaging support processing is ended. It should be noted that the imaging support method described as the action of the flight imaging apparatus 1 described above is an example of an "imaging support method" according to the technology of the present disclosure.

As described above, in the flight imaging apparatus 1 according to the present embodiment, the processor 90 extracts the overlap candidate image, which is the candidate to be overlapped with the imaging target region 3A of the imaging device 40, from the plurality of captured images based on the image map 170 related to a position of each of the plurality of captured images and on the coordinate information related to the position of the imaging target region 3A (refer to FIG. 7). Then, the overlap ratio between the imaging target region 3A and the overlap candidate image is derived (refer to FIG. 8), and in a case where the overlap ratio is equal to or greater than the predetermined overlap ratio, the imaging instruction signal is output to the image sensor 56 of the imaging device 40 (refer to FIG. 10). Therefore, for example, the imaging target region 3A having the overlap ratio with the captured image equal to or greater than the predetermined overlap ratio can be determined with a higher degree of freedom than in a case where the imaging target regions 3A having the overlap ratio with the captured image equal to or greater than the predetermined overlap ratio are determined in an order in which the plurality of captured images are obtained.

In addition, as described above, the processor 90 extracts the overlap candidate image, which is the candidate to be overlapped with the imaging target region 3A of the imaging device 40, from the plurality of captured images (refer to FIG. 7), and derives the overlap ratio between the imaging target region 3A and the overlap candidate image (refer to FIG. 8). Therefore, for example, a load on the processor 90 can be reduced as compared with a case where the overlap ratio between the imaging target region 3A and the plurality of captured images is derived.

In addition, the storage 92 stores an image map 170 indicating the position of each of the plurality of captured images (refer to FIG. 7). Therefore, the overlap candidate image, which is the candidate to be overlapped with the imaging target region 3A of the imaging device 40, can be extracted from the plurality of captured images based on the image map 170.

In addition, in a case where the overlap ratio is equal to or greater than the predetermined overlap ratio, the processor 90 outputs the imaging instruction signal for instructing the image sensor 56 of the imaging device 40 to image the imaging target region 3A (refer to FIG. 10). Therefore, in a case where the overlap ratio is equal to or greater than the predetermined overlap ratio, a new captured image can be obtained by imaging the imaging target region 3A with the image sensor 56.

In addition, in a case where a new captured image is obtained by imaging the imaging target region 3A with the image sensor 56, the processor 90 updates the image map 170 based on the coordinate information included in the captured image information corresponding to the new captured image (that is, the captured image information generated by the second captured image information generation unit 140) (refer to FIG. 10). Therefore, in a case where the image map 170 is updated, the overlap candidate image, which is the candidate to be overlapped with the imaging target region 3A of the imaging device 40, can be extracted based on the updated image map 170.

In addition, the processor 90 generates the association information for associating two captured images, that is, the captured image that is the overlap candidate image having the overlap ratio equal to or greater than the predetermined overlap ratio with the captured image obtained by being captured by the image sensor 56 in response to the imaging instruction signal (refer to FIG. 11). Therefore, the two captured images can be combined based on the association information.

In addition, the association information includes the feature point information related to the feature point included in common in the two captured images (refer to FIG. 11). Therefore, the two captured images can be combined based on the common feature point indicated by the feature point information.

In addition, the processor 90 generates the composite image 160 by combining the two captured images based on the association information (refer to FIG. 12). Therefore, for example, the composite image 160 having a higher accuracy can be generated as compared with a case where the two captured images are combined without being based on the association information.

In addition, the processor 90 extracts the overlap candidate image based on the image map 170 related to the position of each of the plurality of captured images and on the coordinate information related to the position of the imaging target region 3A (refer to FIG. 7). Therefore, the overlap candidate image can be extracted by comparing the coordinates of the four vertices of the imaged region 3B corresponding to each captured image with the coordinates of the four vertices of the imaging target region 3A.

In addition, the coordinate information related to the position of the imaging target region 3A is the information generated based on the position information indicating the position of the imaging device 40, the distance information indicating the distance between the imaging target region 3A and the imaging device 40, and the posture information indicating the posture of the imaging device 40 with respect to the imaging target region 3A. Therefore, the position of the imaging target region 3A corresponding to the position of the imaging device 40, the distance between the imaging target region 3A and the imaging device 40, and the posture of the imaging device 40 with respect to the imaging target region 3A can be obtained.

In addition, in a case where the overlap ratio is less than the predetermined overlap ratio, the processor 90 outputs the change instruction signal indicating the instruction to change the position and/or the posture of the imaging device 40 to the flying object 10 (refer to FIG. 9). Therefore, the position and/or the posture of the flying object 10 is changed based on the change instruction signal, and further, the position and/or the posture of the imaging device 40 is changed, so that the position of the imaging target region 3A (for example, the coordinates of the four vertices of the imaging target region 3A) of the imaging device 40 can be changed.

In addition, the processor 90 generates the change instruction signal based on the image map 170 related to the position of each of the plurality of captured images and on the coordinate information related to the position of the imaging target region 3A (refer to FIG. 9). Therefore, the position and/or the posture of the imaging device 40 can be changed based on a relative positional relationship between the position of each of the plurality of captured images and the position of the imaging target region 3A.

Figure 14:
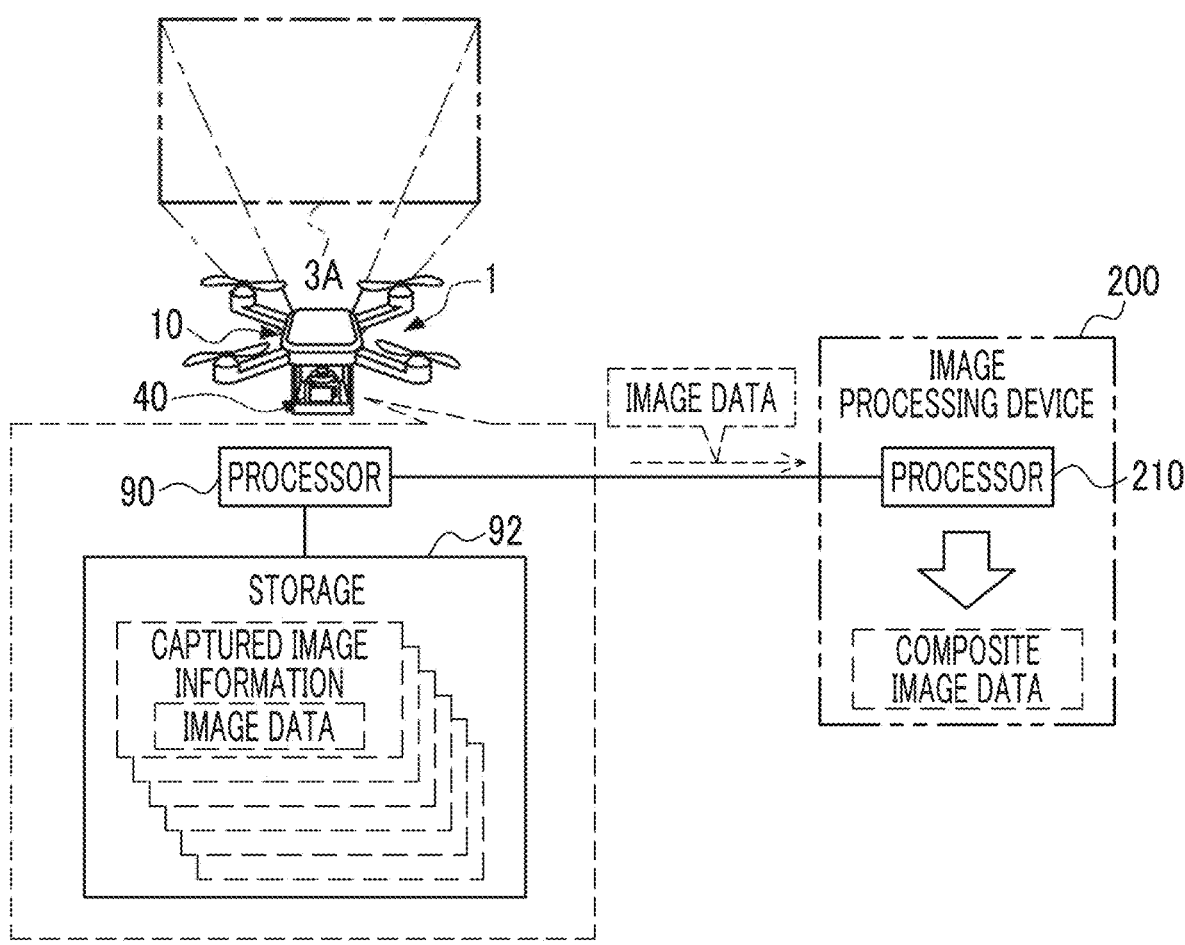
FIG. 14 is a schematic diagram schematically showing a modification example of the flight imaging apparatus.

In the above-described embodiment, the processor 90 of the imaging device 40 generates the composite image data indicating the composite image 160 based on the image data included in the plurality of pieces of captured image information stored in the storage 92 (refer to FIG. 12). However, as shown in FIG. 14 as an example, the plurality of pieces of image data may be input to a processor 210 of an image processing device 200, which is communicatably connected to the imaging device 40 via wired connection or wireless connection, from the processor 90 of the imaging device 40, and the processor 210 of the image processing device 200 may generate the composite image data based on the input plurality of pieces of image data. The processor 210 is an example of a "combining processor" according to the technology of the present disclosure. The processor 90 and the processor 210 are examples of a "processor" according to the technology of the present disclosure.

In the example shown in FIG. 14, since the processor 90 of the imaging device 40 does not need to generate the composite image data, the load on the processor 90 can be reduced as compared with a case in which the processor 90 of the imaging device 40 generates the composite image data.

In addition, in the above-described embodiment, the coordinate information, which is the information related to the position of the imaging target region 3A, is used in a case where the overlap candidate image is extracted (refer to FIG. 7), but the information related to the position of the imaging device 40 may be used instead of the coordinate information or in addition to the coordinate information.

In addition, in the above-described embodiment, the image map 170 including the coordinate information is used as the information related to the position of each of the plurality of captured images (refer to FIG. 7), but information of a system different from the image map 170 may be used instead of the image map 170 or in addition to the image map 170.

In addition, in the above-described embodiment, the plurality of captured images are acquired by the imaging device 40, but the plurality of captured images may be acquired by an additional imaging device other than the imaging device 40. Then, the overlap candidate image, which is the candidate to be overlapped with the imaging target region 3A of the imaging device 40, may be extracted from the plurality of captured images acquired by the additional imaging device.

Further, the processor 90 has been exemplified in each of the above-described embodiments, but at least one other CPU, at least one GPU, and/or at least one TPU may be used instead of the processor 90 or together with the processor 90.

Further, an example in which the imaging support program 118 is stored in the storage 92 has been described in each of the above-described embodiments, but the technology of the present disclosure is not limited thereto. For example, the imaging support program 118 may be stored in a portable non-transitory computer-readable storage medium such as an SSD or a USB memory (hereinafter, simply referred to as a "non-transitory storage medium"). The imaging support program 118 stored in the non-transitory storage medium is installed in the computer 52 of the imaging device 40, and the processor 90 executes the processing according to the imaging support program 118.

Further, the imaging support program 118 may be stored in a storage device such as an additional computer or a server device connected to the imaging device 40 via a network, and the imaging support program 118 may be downloaded in response to a request from the imaging device 40 and installed in the computer 52.

In addition, it is not necessary to store all of the imaging support programs 118 in the storage device such as the additional computer or the server device connected to the imaging device 40, or in the storage 92, and a part of the imaging support program 118 may be stored.

Further, although the computer 52 is incorporated in the imaging device 40, the technology of the present disclosure is not limited thereto, and, for example, the computer 52 may be provided outside the imaging device 40.

Further, although the computer 52 including the processor 90, the storage 92, and the RAM 94 is exemplified in each of the above-described embodiments, the technology of the present disclosure is not limited thereto, and a device including an ASIC, an FPGA, and/or a PLD may be applied instead of the computer 52. Further, instead of the computer 52, a combination of a hardware configuration and a software configuration may be used.

Further, the following various processors can be used as hardware resources for executing various kinds of processing described in each of the above-described embodiments. Examples of the processors include a CPU that is a general-use processor executing software, that is, a program, to function as a hardware resource executing various kinds of processing. Moreover, examples of the processor include a dedicated electronic circuit which is a processor having a circuit configuration designed to be dedicated for executing specific processing, such as the FPGA, the PLD, or the ASIC. Any processor has a memory built in or connected to it, and any processor uses the memory to execute various kinds of processing.

The hardware resource executing various kinds of processing may be configured by one of these various processors, or may be configured by a combination of two or more processors of the same type or different types (for example, a combination of a plurality of FPGAs or a combination of a CPU and an FPGA). Further, the hardware resource executing various kinds of processing may be one processor.

As an example in which the hardware resource is configured by one processor, first, there is a form in which one processor is configured by a combination of one or more CPUs and software, and this processor functions as the hardware resource executing various kinds of processing. Second, as represented by an SoC or the like, there is a form in which a processor that realizes the functions of the entire system including a plurality of hardware resources executing various kinds of processing with one IC chip is used. As described above, various kinds of processing are realized by using one or more of the various processors described above as hardware resources.

Further, as the hardware structure of these various processors, more specifically, it is possible to use an electronic circuit in which circuit elements, such as semiconductor elements, are combined. In addition, the various kinds of processing described above are merely an example. Therefore, it goes without saying that unnecessary steps may be deleted, new steps may be added, or the processing order may be changed without departing from the scope of the technology of the present disclosure.

The content of the above description and the content of the drawings are detailed descriptions for parts according to the technology of the present disclosure and are merely examples of the technology of the present disclosure. For example, description of the configurations, functions, actions, and effects described above is description of an example of configurations, functions, actions, and effects of a part according to the technology of the present disclosure. Thus, it goes without saying that unnecessary parts may be deleted, new elements may be added, or replacement may be made to the content of the above description and to the content of the drawings without departing from the scope of the technology of the present disclosure. Further, in order to avoid complication and to facilitate understanding of the parts according to the technology of the present disclosure, description related to common technical knowledge or the like that does not need to be particularly described in order to enable implementation of the technology of the present disclosure is omitted in the content of the above description and the content of the drawings.

In the present specification, "A and/or B" has the same meaning as "at least one of A or B". That is, "A and/or B" may refer to A alone, B alone, or a combination of A and B. Further, in the present specification, in a case where three or more matters are expressed by "and/or" in combination, the same concept as "A and/or B" is applied.

All cited documents, patent applications, and technical standards described in the specification are incorporated by reference in the specification to the same extent as in a case where each individual cited document, patent application, or technical standard is specifically and individually indicated to be incorporated by reference.

What is claimed is:

1. An imaging support device comprising a processor, wherein the processor is configured to:
   extract, based on first position information related to a position of each of a plurality of captured images and on second position information related to a position of an imaging device, an overlap candidate image, which is a candidate to be overlapped with an imaging target region of the imaging device, from the plurality of captured images;
   derive an overlap ratio between the imaging target region and the overlap candidate image; and
   output a first signal to the imaging device in a case where the overlap ratio is equal to or greater than a predetermined overlap ratio.

2. The imaging support device according to claim 1, wherein the first position information includes an image map indicating the position of each of the plurality of captured images.

3. The imaging support device according to claim 1, wherein the first signal includes an imaging instruction signal for instructing the imaging device to image the imaging target region.

4. The imaging support device according to claim 3, wherein the processor is configured to generate association information that is information for associating a first captured image, which is the overlap candidate image having the overlap ratio equal to or greater than the predetermined overlap ratio, with a second captured image obtained by being captured by the imaging device in response to the imaging instruction signal.

5. The imaging support device according to claim 4, wherein the association information includes feature point information related to a feature point included in common in the first captured image and the second captured image.

6. The imaging support device according to claim 4, wherein the processor is configured to generate a composite image by combining the first captured image and the second captured image based on the association information.

7. The imaging support device according to claim 6, wherein the processor includes a combining processor that generates the composite image.

8. The imaging support device according to claim 4, wherein the plurality of captured images include the second captured image, and
   the processor is configured to update the first position information based on third position information related to a position of the second captured image.

9. The imaging support device according to claim 1, wherein the second position information is information related to a position of the imaging target region.

10. The imaging support device according to claim 9, wherein the second position information is information generated based on fourth position information related to the position of the imaging device, distance information related to a distance between the imaging target region and the imaging device, and posture information related to a posture of the imaging device with respect to the imaging target region.

11. The imaging support device according to claim 1, wherein the processor is configured to output a change instruction signal indicating an instruction to change the position and/or a posture of the imaging device in a case where the overlap ratio is less than the predetermined overlap ratio.

12. The imaging support device according to claim 11, wherein the processor is configured to generate the change instruction signal based on the first position information and the second position information.

13. An imaging support method comprising:
   extracting, based on first position information related to a position of each of a plurality of captured images and on second position information related to a position of an imaging device, an overlap candidate image, which is a candidate to be overlapped with an imaging target region of the imaging device, from the plurality of captured images;
   deriving an overlap ratio between the imaging target region and the overlap candidate image; and
   outputting a first signal to the imaging device in a case where the overlap ratio is equal to or greater than a predetermined overlap ratio.

14. A non-transitory computer-readable storage medium storing a program causing a computer to execute a process comprising:
   extracting, based on first position information related to a position of each of a plurality of captured images and on second position information related to a position of an imaging device, an overlap candidate image, which is a candidate to be overlapped with an imaging target region of the imaging device, from the plurality of captured images;
   deriving an overlap ratio between the imaging target region and the overlap candidate image; and
   outputting a first signal to the imaging device in a case where the overlap ratio is equal to or greater than a predetermined overlap ratio.

* * * * *